US010306014B2

(12) United States Patent
Liang et al.

(10) Patent No.: US 10,306,014 B2
(45) Date of Patent: May 28, 2019

(54) METHOD, DEVICE, AND SYSTEM FOR CONTROLLING QUALITY OF SERVICE

(71) Applicant: Huawei Technologies Co., Ltd., Shenzhen (CN)

(72) Inventors: Biao Liang, Hangzhou (CN); Bin Xia, Hangzhou (CN); Tizheng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 15/376,153

(22) Filed: Dec. 12, 2016

(65) Prior Publication Data

US 2017/0094015 A1 Mar. 30, 2017

Related U.S. Application Data

(63) Continuation of application No. PCT/CN2015/091976, filed on Oct. 15, 2015.

(30) Foreign Application Priority Data

Apr. 17, 2015 (CN) .......................... 2015 1 0185919

(51) Int. Cl.
*G06F 15/16* (2006.01)
*H04L 29/08* (2006.01)
(Continued)

(52) U.S. Cl.
CPC ............ *H04L 67/322* (2013.01); *H04L 29/06* (2013.01); *H04L 43/062* (2013.01); *H04L 65/80* (2013.01);
(Continued)

(58) Field of Classification Search
CPC ........... H04L 43/063; H04L 4/24; H04W 4/60
(Continued)

(56) References Cited

U.S. PATENT DOCUMENTS 8,893,009 B2 * 11/2014 Raleigh ................ H04M 15/00
715/736
9,215,159 B2 * 12/2015 Raleigh ............... H04L 67/2804
(Continued)

FOREIGN PATENT DOCUMENTS

CN 104284324 A 1/2015
CN 104836800 A 8/2015
(Continued)

OTHER PUBLICATIONS

Machine Translation and Abstract of Chinese Publication No. CN104836800, Aug. 12, 2015, 19 pages.
(Continued)

*Primary Examiner* — Khanh Q Dinh
(74) *Attorney, Agent, or Firm* — Conley Rose, P.C.

(57) ABSTRACT

A method for controlling quality of service, including receiving an application programming interface (API) call request that a user terminal is triggered to send when an application (APP) is being used, where the API call request carries a user identifier of the APP and an identifier of the APP, acquiring a quality of service control policy of the APP according to the identifier of the APP and the user identifier of the APP, and controlling, according to the quality of service control policy of the APP, quality of service of a user indicated by the user identifier. Hence, quality of service control can be provided for an APP that registers with an API management device, which improves the APP development efficiency.

34 Claims, 11 Drawing Sheets

(51) Int. Cl.
  *H04L 12/26* (2006.01)
  *H04L 29/06* (2006.01)
  *H04W 4/60* (2018.01)
  *H04W 28/24* (2009.01)

(52) U.S. Cl.
  CPC .......... *H04L 67/16* (2013.01); *H04L 67/2842* (2013.01); *H04W 4/60* (2018.02); *H04W 28/24* (2013.01)

(58) Field of Classification Search
  USPC .......................................................... 709/224
  See application file for complete search history.

(56) References Cited

U.S. PATENT DOCUMENTS

| | | | |
|---|---|---|---|
| 9,392,462 B2 * | 7/2016 | Raleigh | H04W 12/08 |
| 9,557,889 B2 * | 1/2017 | Raleigh | G06F 3/0482 |
| 9,858,559 B2 * | 1/2018 | Raleigh | G06Q 20/145 |
| 2006/0149845 A1 | 7/2006 | Malin et al. | |
| 2012/0215911 A1 | 8/2012 | Raleigh et al. | |
| 2012/0221955 A1 * | 8/2012 | Raleigh | H04M 15/00 715/736 |
| 2014/0169172 A1 | 6/2014 | Hu et al. | |
| 2014/0337519 A1 * | 11/2014 | Raleigh | H04L 67/2804 709/224 |
| 2015/0143456 A1 * | 5/2015 | Raleigh | H04W 12/08 726/1 |
| 2015/0207708 A1 * | 7/2015 | Raleigh | H04L 67/2804 709/217 |

FOREIGN PATENT DOCUMENTS

| | | |
|---|---|---|
| EP | 2983335 A1 | 10/2016 |
| WO | 2006074008 A2 | 7/2006 |
| WO | 2011107949 A1 | 9/2011 |
| WO | 2014169455 A1 | 10/2014 |

OTHER PUBLICATIONS

Foreign Communication From a Counterpart Application, PCT Application No. PCT/CN2015/091976, English Translation of International Search Report dated Jan. 25, 2016, 2 pages.
Foreign Communication From a Counterpart Application, European Application No. 15888993.1, Extended European Search Report dated Jun. 13, 2017, 9 pages.
Foreign Communication From a Counterpart Application, Chinese Application No. 201510185919.7, Chinese Office Action dated Jul. 18, 2017, 8 pages.

* cited by examiner

METHOD, DEVICE, AND SYSTEM FOR CONTROLLING QUALITY OF SERVICE

CROSS-REFERENCE TO RELATED APPLICATIONS

This application is a continuation of International Application No. PCT/CN2015/091976, filed on Oct. 15, 2015, which claims priority to Chinese Patent Application No. 201510185919.7, filed on Apr. 17, 2015. The disclosures of the aforementioned applications are hereby incorporated by reference in their entireties.

TECHNICAL FIELD

The present disclosure relates to the field of computer technologies, and in particular, to a method, a device, and a system for controlling quality of service (QoS).

BACKGROUND

An open application programming interface (Open API) may be open to a third-party application (APP) developer in a charging or free manner for use.

An APP developer may quickly develop an APP based on an Open API, and put the APP in an APP market. For example, based on an Open API of GOOGLE Maps, the APP developer may quickly develop a simple APP after consulting a manual provided by GOOGLE in order to implement a map search function. In this way, the APP developer can be disengaged from complex core function implementation, and focus on aspects such as interface design and user interaction design.

An API developer hosts an API on an API management device, and an APP developer subscribes to a needed API from the API management device. Each user needs corresponding QoS control.

In the prior art, one set of QoS management functions needs to be developed for each APP, which imposes a quite strict requirement on experience and skills of an APP developer. Workload for development of a set of QoS management functions is quite heavy, which objectively prolongs an APP development period and test period, deviates from original intention of quickly developing an APP based on an Open API, and consequently, is not helpful for quickly putting the APP into market.

SUMMARY

Embodiments of the present disclosure provide a method for controlling QoS, which can provide QoS control for an APP that registers with an API management device, and improve the APP development efficiency. The embodiments of the present disclosure further provide a corresponding device and system.

A first aspect of the present disclosure provides a method for controlling QoS, the method is applied to an API management device that provides an open API for an APP, and the method includes receiving an API call request that a user terminal is triggered, to send when the APP is being used, where the API call request carries a user identifier of the APP and an identifier of the APP, acquiring a QoS control policy of the APP according to the identifier of the APP and the user identifier of the APP, and controlling, according to the QoS control policy of the APP, QoS of a user indicated by the user identifier.

With reference to the first aspect, in a first possible implementation manner, acquiring a QoS control policy of the APP according to the identifier of the APP and the user identifier of the APP includes acquiring, according to the identifier of the APP and the user identifier of the APP, a subscriber category that is of the APP and corresponding to the user identifier of the APP, and acquiring, according to the subscriber category of the APP, the QoS control policy that is of the APP and corresponding to the subscriber category of the APP.

With reference to the first possible implementation manner of the first aspect, in a second possible implementation manner, before receiving an API call request that a user terminal is triggered, to send when the APP is being used, the method further includes receiving a registration request of the APP, and receiving a correspondence between a user identifier of the APP and a subscriber category of the APP and a correspondence between a subscriber category of the APP and a QoS control policy of the APP, and registering the APP according to the registration request, and storing, in the API management device, the correspondence between a user identifier of the APP and a subscriber category of the APP and the correspondence between a subscriber category of the APP and a QoS control policy of the APP.

With reference to the second possible implementation manner of the first aspect, in a third possible implementation manner, acquiring, according to the identifier of the APP and the user identifier of the APP, a subscriber category that is of the APP and corresponding to the user identifier of the APP includes acquiring, from the cache data, the subscriber category that is of the APP and corresponding to the user identifier of the APP if cache data of the correspondence between a user identifier of the APP and a subscriber category of the APP exists in a cache area of the API management device, or acquiring, from the correspondence that is between a user identifier of the APP and a subscriber category of the APP and already stored in the non-cache area, the subscriber category that is of the APP and corresponding to the user identifier of the APP if cache data of the correspondence between a user identifier of the APP and a subscriber category of the APP does not exist in a cache area of the API management device, and correspondingly, acquiring, according to the subscriber category of the APP, the QoS control policy that is of the APP and corresponding to the subscriber category of the APP includes acquiring, from the cache area, the QoS control policy that is of the APP and corresponding to the subscriber category of the APP when the subscriber category of the APP is acquired from the cache area, or acquiring, from the non-cache area, the QoS control policy that is of the APP and corresponding to the subscriber category of the APP when the subscriber category of the APP is acquired from the non-cache area.

With reference to the first possible implementation manner of the first aspect, in a fourth possible implementation manner, before receiving an API call request that a user terminal is triggered, to send when the APP is being used, the method further includes receiving a registration request of the APP, and receiving a first search indication identifier and a correspondence between a subscriber category of the APP and a QoS control policy of the APP, where the first search indication identifier is used to indicate a necessity of searching an APP server for a correspondence between a user identifier of the APP and a subscriber category of the APP, and registering the APP according to the registration request, and storing, in the API management device, the first search indication identifier and the correspondence between a subscriber category of the APP and a QoS control policy of the APP.

With reference to the fourth possible implementation manner of the first aspect, in a fifth possible implementation manner, acquiring, according to the identifier of the APP and the user identifier of the APP, a subscriber category that is of the APP and corresponding to the user identifier of the APP includes acquiring, from the cache data, the subscriber category that is of the APP and corresponding to the user identifier of the APP if cache data of the correspondence between a user identifier of the APP and a subscriber category of the APP exists in a cache area of the API management device, or sending a search request to the APP server according to the first search indication identifier if cache data of the correspondence between a user identifier of the APP and a subscriber category of the APP does not exist in a cache area of the API management device, where the search request carries the user identifier of the APP, and the user identifier of the APP is used by the APP server to search for the subscriber category that is of the APP and corresponding to the user identifier of the APP, and receiving a search response message sent by the APP server, where the search response message carries the subscriber category of the APP, and correspondingly, acquiring, according to the subscriber category of the APP, the QoS control policy that is of the APP and corresponding to the subscriber category of the APP includes acquiring, from the cache area, the QoS control policy that is of the APP and corresponding to the subscriber category of the APP when the subscriber category of the APP is acquired from the cache area, or acquiring, from the non-cache area, the QoS control policy that is of the APP and corresponding to the subscriber category of the APP when the subscriber category of the APP is acquired from the APP server.

With reference to the first possible implementation manner of the first aspect, in a sixth possible implementation manner, before receiving an API call request that a user terminal is triggered, to send when the APP is being used, the method further includes receiving a registration request of the APP, and receiving a second search indication identifier and a correspondence between a user identifier of the APP and a subscriber category of the APP, where the second search indication identifier is used to indicate a necessity of searching an APP server for a correspondence between a subscriber category of the APP and a QoS control policy of the APP, and registering the APP according to the registration request, and storing, in the API management device, the second search indication identifier and the correspondence between a user identifier of the APP and a subscriber category of the APP.

With reference to the sixth possible implementation manner of the first aspect, in a seventh possible implementation manner, acquiring, according to the identifier of the APP and the user identifier of the APP, a subscriber category that is of the APP and corresponding to the user identifier of the APP includes acquiring, from the cache data, the subscriber category that is of the APP and corresponding to the user identifier of the APP if cache data of the correspondence between a user identifier of the APP and a subscriber category of the APP exists in a cache area of the API management device, or acquiring, from the correspondence that is between a user identifier of the APP and a subscriber category of the APP and already stored in the non-cache area, the subscriber category that is of the APP and corresponding to the user identifier of the APP if cache data of the correspondence between a user identifier of the APP and a subscriber category of the APP does not exist in a cache area of the API management device, and correspondingly, acquiring, according to the subscriber category of the APP, the QoS control policy that is of the APP and corresponding to the subscriber category of the APP includes acquiring, from the cache area, the QoS control policy that is of the APP and corresponding to the subscriber category of the APP when the subscriber category of the APP is acquired from the cache area, or sending a search request to the APP server according to the second search indication identifier when the subscriber category of the APP is acquired from the non-cache area, where the search request carries the subscriber category of the APP, and the subscriber category of the APP is used by the APP server to search for the QoS control policy that is of the APP and corresponding to the subscriber category of the APP, and receiving a search response message sent by the APP server, where the search response message carries the QoS control policy of the APP.

With reference to the first possible implementation manner of the first aspect, in an eighth possible implementation manner, before receiving an API call request that a user terminal is triggered, to send when the APP is being used, the method further includes receiving a registration request of the APP, and receiving a third search indication identifier, where the third search indication identifier is used to instruct to search an APP server for a correspondence between a user identifier of the APP and a subscriber category of the APP and a correspondence between a subscriber category of the APP and a QoS control policy of the APP, and registering the APP according to the registration request, and storing, in the API management device, the third search indication identifier.

With reference to the eighth possible implementation manner of the first aspect, in a ninth possible implementation manner, acquiring, according to the user identifier of the APP, a subscriber category that is of the APP and corresponding to the user identifier of the APP and acquiring, according to the subscriber category of the APP, the QoS control policy that is of the APP and corresponding to the subscriber category of the APP include acquiring, from the cache data, the subscriber category that is of the APP and corresponding to the user identifier of the APP, and acquiring, from the cache area, the QoS control policy that is of the APP and corresponding to the subscriber category of the APP if cache data of the correspondence between a user identifier of the APP and a subscriber category of the APP exists in a cache area of the API management device, or sending a search request to the APP server according to the third search indication identifier if cache data of the correspondence between a user identifier of the APP and a subscriber category of the APP does not exist in a cache area of the API management device, where the search request carries the user identifier of the APP, and the user identifier of the APP is used by the APP server to search for the subscriber category that is of the APP and corresponding to the user identifier of the APP and the QoS control policy that is of the APP and corresponding to the subscriber category of the APP, and receiving a search response message sent by the APP server, where the search response message carries the QoS control policy of the APP.

With reference to the third, the fifth, the seventh, or the ninth possible implementation manner of the first aspect, in a tenth possible implementation manner, when the QoS control policy of the APP is not acquired from the cache area, the method further includes storing, in the cache area of the API management device, the correspondence between a user identifier of the APP and a subscriber category of the APP and the correspondence between a subscriber category of the APP and a QoS control policy of the APP.

It should be noted that in the third, the fifth, the seventh, and the ninth possible implementation manners of the first aspect, it is only described that the QoS control policy is also acquired from the cache area when the subscriber category is acquired from the cache area. However, actually, alternatively, the QoS control policy of the APP may be acquired from the non-cache area or the APP server when the subscriber category of the APP is acquired from the cache area.

With reference to the first aspect or any one of the first to the tenth possible implementation manners of the first aspect, in an eleventh possible implementation manner, before acquiring, according to the user identifier of the APP, a subscriber category that is of the APP and corresponding to the user identifier of the APP, the method further includes confirming whether authentication is performed on the APP, and acquiring a user name of the APP and using the user name as the user identifier when authentication is performed, or acquiring the user identifier from an agreement field agreed on between the API and the user terminal in advance when authentication is not performed.

With reference to the first aspect or any one of the first to the eleventh possible implementation manners of the first aspect, in a twelfth possible implementation manner, the method further includes receiving an offline request that is of the APP and sent by the user terminal, and clearing data corresponding to the user identifier from the cache area of the API management device.

With reference to the first aspect or any one of the first to the eleventh possible implementation manners of the first aspect, in a thirteenth possible implementation manner, the method further includes adding, to the cache area of the API management device, data that is corresponding to the user identifier and generated when the APP runs, and setting a time tag for the data, and clearing expired data from the cache area of the API management device according to the time tag after a preset time is reached.

A second aspect of the present disclosure provides a method for controlling QoS, the method is applied to an API management device that provides an open API for an APP, and the method includes receiving an API call request that a user terminal is triggered, when a user uses the APP, to send, where the API call request carries an identifier of the APP and an identifier of a subscriber category of the APP, acquiring, according to the identifier of the APP and the identifier of the subscriber category of the APP, a QoS control policy that is of the APP and corresponding to the subscriber category of the APP, and controlling, QoS of the user according to the QoS control policy of the APP.

With reference to the second aspect, in a first possible implementation manner, acquiring, according to the identifier of the APP and the identifier of the subscriber category of the APP, a QoS control policy that is of the APP and corresponding to the subscriber category of the APP includes acquiring, from the cache data, the QoS control policy that is of the APP and corresponding to the subscriber category of the APP if cache data of a correspondence between a subscriber category of the APP and a QoS control policy of the APP exists in a cache area of the API management device, or acquiring, from the correspondence that is between a subscriber category of the APP and a QoS control policy of the APP and already stored in a non-cache area, the QoS control policy that is of the APP and corresponding to the subscriber category of the APP if cache data of a correspondence between a subscriber category of the APP and a QoS control policy of the APP does not exist in a cache area of the API management device.

With reference to the second aspect, in a second possible implementation manner, acquiring, according to the identifier of the APP and the identifier of the subscriber category of the APP, a QoS control policy that is of the APP and corresponding to the subscriber category of the APP includes acquiring, from the cache data, the QoS control policy that is of the APP and corresponding to the subscriber category of the APP if cache data of a correspondence between a subscriber category of the APP and a QoS control policy of the APP exists in a cache area of the API management device, or sending a search request to an APP server if cache data of a correspondence between a subscriber category of the APP and a QoS control policy of the APP does not exist in a cache area of the API management device, where the search request carries the identifier of the subscriber category of the APP, and the identifier of the subscriber category of the APP is used by the APP server to search for the QoS control policy that is of the APP and corresponding to the subscriber category of the APP, and receiving a search response message sent by the APP server, where the search response message carries the QoS control policy that is of the APP and corresponding to the subscriber category of the APP.

In addition, it should be noted that the second aspect of the embodiments of the present disclosure further provides multiple implementation solutions of buffering, confirmation, and clearing in the ninth to the twelfth possible implementation manners of the first aspect, reference may be made to the solutions of buffering, confirmation, and clearing in the ninth to the twelfth possible implementation manners of the first aspect for understanding, and details are not described herein again.

A solution of determining a QoS control policy using an identifier of a subscriber category according to this embodiment of the present disclosure may be used in a local area network or a securely isolated demilitarized zone (DMZ) in a network environment. The identifier of the subscriber category is directly carried in a request in a plaintext form, and there may be or may not be a user identifier. Alternatively, during network transmission, the identifier of the subscriber category may be directly carried in a request in a ciphertext form, and there may be or may not be a user identifier. The identifier of the subscriber category is directly carried in a request in a plaintext or ciphertext form, and there may be or may not be a user identifier.

A third aspect of the present disclosure provides an API management device, including a receiving module configured to receive an API call request that a user terminal is triggered, to send when an APP is being used, where the API call request carries a user identifier of the APP and an identifier of the APP, an acquiring module configured to acquire a QoS control policy of the APP according to the identifier of the APP and the user identifier of the APP that are received by the receiving module, and a control module configured to control, according to the QoS control policy that is of the APP and acquired by the acquiring module, QoS of a user indicated by the user identifier.

With reference to the third aspect, in a first possible implementation manner, the acquiring module includes a first acquiring submodule configured to acquire, according to the identifier of the APP and the user identifier of the APP that are received by the receiving module, a subscriber category that is of the APP and corresponding to the user identifier of the APP, and a second acquiring submodule configured to acquire, according to the subscriber category that is of the APP and acquired by the first acquiring submodule, the QoS control policy that is of the APP and corresponding to the subscriber category of the APP.

With reference to the first possible implementation manner of the third aspect, in a second possible implementation manner, the API management device further includes a first registration module and a first storage module. The receiving module is further configured to receive a registration request of the APP, and receive a correspondence between a user identifier of the APP and a subscriber category of the APP and a correspondence between a subscriber category of the APP and a QoS control policy of the APP. The first registration module is configured to register the APP according to the registration request received by the receiving module, and the first storage module is configured to store the correspondence between a user identifier of the APP and a subscriber category of the APP and received by the receiving module and the correspondence that is between a subscriber category of the APP and a QoS control policy of the APP and received by the receiving module.

With reference to the second possible implementation manner of the third aspect, in a third possible implementation manner, the first acquiring submodule is further configured to acquire, from the cache data, the subscriber category that is of the APP and corresponding to the user identifier of the APP if cache data of the correspondence between a user identifier of the APP and a subscriber category of the APP exists in a cache area of the API management device, or acquire, from the correspondence that is between a user identifier of the APP and a subscriber category of the APP and already stored in the non-cache area, the subscriber category that is of the APP and corresponding to the user identifier of the APP if cache data of the correspondence between a user identifier of the APP and a subscriber category of the APP does not exist in a cache area of the API management device, and the second acquiring submodule is further configured to acquire, from the cache area, the QoS control policy that is of the APP and corresponding to the subscriber category of the APP when the subscriber category of the APP is acquired from the cache area, or acquire, from the non-cache area, the QoS control policy that is of the APP and corresponding to the subscriber category of the APP when the subscriber category of the APP is acquired from the non-cache area.

With reference to the first possible implementation manner of the third aspect, in a fourth possible implementation manner, the API management device further includes a second registration module and a second storage module. The receiving module is further configured to receive a registration request of the APP, and receive a first search indication identifier and a correspondence between a subscriber category of the APP and a QoS control policy of the APP, where the first search indication identifier is used to indicate a necessity of searching an APP server for a correspondence between a user identifier of the APP and a subscriber category of the APP. The second registration module is configured to register the APP according to the registration request received by the receiving module, and the second storage module is configured to store the first search indication identifier received by the receiving module and the correspondence that is between a subscriber category of the APP and a QoS control policy of the APP and received by the receiving module.

With reference to the fourth possible implementation manner of the third aspect, in a fifth possible implementation manner, the first acquiring submodule is further configured to acquire, from the cache data, the subscriber category that is of the APP and corresponding to the user identifier of the APP if cache data of the correspondence between a user identifier of the APP and a subscriber category of the APP exists in a cache area of the API management device, or send a search request to the APP server according to the first search indication identifier if cache data of the correspondence between a user identifier of the APP and a subscriber category of the APP does not exist in a cache area of the API management device, where the search request carries the user identifier of the APP, and the user identifier of the APP is used by the APP server to search for the subscriber category that is of the APP and corresponding to the user identifier of the APP, and receive a search response message sent by the APP server, where the search response message carries the subscriber category of the APP, and the second acquiring submodule is further configured to acquire, from the cache area, the QoS control policy that is of the APP and corresponding to the subscriber category of the APP when the subscriber category of the APP is acquired from the cache area, or acquire, from the non-cache area, the QoS control policy that is of the APP and corresponding to the subscriber category of the APP when the subscriber category of the APP is acquired from the APP server.

With reference to the first possible implementation manner of the third aspect, in a sixth possible implementation manner, the API management device further includes a third registration module and a third storage module. The receiving module is configured to receive a registration request of the APP, and receive a second search indication identifier and a correspondence between a user identifier of the APP and a subscriber category of the APP, where the second search indication identifier is used to indicate a necessity of searching an APP server for a correspondence between a subscriber category of the APP and a QoS control policy of the APP. The third registration module is configured to register the APP according to the registration request received by the receiving module, and the third storage module is configured to store the second search indication identifier received by the receiving module and the correspondence that is between a user identifier of the APP and a subscriber category of the APP and received by the receiving module.

With reference to the sixth possible implementation manner of the third aspect, in a seventh possible implementation manner, the first acquiring submodule is further configured to acquire, from the cache data, the subscriber category that is of the APP and corresponding to the user identifier of the APP if cache data of the correspondence between a user identifier of the APP and a subscriber category of the APP exists in a cache area of the API management device, or acquire, from the correspondence that is between a user identifier of the APP and a subscriber category of the APP and already stored in the non-cache area, the subscriber category that is of the APP and corresponding to the user identifier of the APP if cache data of the correspondence between a user identifier of the APP and a subscriber category of the APP does not exist in a cache area of the API management device, and the second acquiring submodule is further configured to acquire, from the cache area, the QoS control policy that is of the APP and corresponding to the subscriber category of the APP when the subscriber category of the APP is acquired from the cache area, or send a search request to the APP server according to the second search indication identifier when the subscriber category of the APP is acquired from the non-cache area, where the search request carries the subscriber category of the APP, and the subscriber category of the APP is used by the APP server to search for the QoS control policy that is of the APP and corresponding to the subscriber category of the APP, and receive a search response message sent by the APP server, where the search response message carries the QoS control policy of the APP.

With reference to the first possible implementation manner of the third aspect, in an eighth possible implementation manner, the API management device further includes a fourth registration module and a fourth storage module. The receiving module is further configured to receive a registration request of the APP, and receive a third search indication identifier, where the third search indication identifier is used to instruct to search an APP server for a correspondence between a user identifier of the APP and a subscriber category of the APP and a correspondence between a subscriber category of the APP and a QoS control policy of the APP. The fourth registration module is configured to register the APP according to the registration request received by the receiving module, and the fourth storage module is configured to store the third search indication identifier received by the receiving module.

With reference to the eighth possible implementation manner of the third aspect, in a ninth possible implementation manner, the first acquiring submodule is further configured to acquire, from the cache data, the subscriber category that is of the APP and corresponding to the user identifier of the APP if cache data of the correspondence between a user identifier of the APP and a subscriber category of the APP exists in a cache area of the API management device, and the second acquiring submodule is further configured to acquire, from the cache area, the QoS control policy that is of the APP and corresponding to the subscriber category of the APP when the subscriber category that is of the APP and corresponding to the user identifier of the APP is acquired from the cache data, or send a search request to the APP server according to the third search indication identifier if cache data of the correspondence between a user identifier of the APP and a subscriber category of the APP does not exist in a cache area of the API management device, where the search request carries the user identifier of the APP, and the user identifier of the APP is used by the APP server to search for the subscriber category that is of the APP and corresponding to the user identifier of the APP and the QoS control policy that is of the APP and corresponding to the subscriber category of the APP, and receive a search response message sent by the APP server, where the search response message carries the QoS control policy of the APP.

With reference to the third, the fifth, the seventh, or the ninth possible implementation manner of the third aspect, in a tenth possible implementation manner, the control module is further configured to store, in the cache area of the API management device, the correspondence between a user identifier of the APP and a subscriber category of the APP and the correspondence between a subscriber category of the APP and a QoS control policy of the APP when the QoS control policy of the APP is not acquired from the cache area.

It should be noted that in the third, the fifth, the seventh, and the ninth possible implementation manners of the third aspect, it is only described that the QoS control policy is also acquired from the cache area when the subscriber category is acquired from the cache area. However, actually, alternatively, the QoS control policy of the APP may be acquired from the non-cache area or the APP server when the subscriber category of the APP is acquired from the cache area.

With reference to the third aspect or any one of the first to the tenth possible implementation manners of the third aspect, in an eleventh possible implementation manner, the API management device further includes a confirmation module. The confirmation module is configured to confirm whether authentication is performed on the APP, and the first acquiring submodule is further configured to acquire a user name of the APP and use the user name as the user identifier when the confirmation module confirms that authentication is performed, or acquire the user identifier from an agreement field agreed on between an API and the user terminal in advance when authentication is not performed.

With reference to the third aspect or any one of the first to the eleventh possible implementation manners of the third aspect, in a twelfth possible implementation manner, the API management device further includes a first clearing module. The receiving module is further configured to receive an offline request that is of the APP and sent by the user terminal, and the first clearing module is configured to clear data corresponding to the user identifier from the cache area of the API management device after the receiving module receives the offline request of the APP.

With reference to the third aspect or any one of the first to the eleventh possible implementation manners of the third aspect, in a thirteenth possible implementation manner, the API management device further includes an adding module, a setting module, and a second clearing module. The adding module is configured to add, to the cache area of the API management device, data that is corresponding to the user identifier, generated when the APP runs, and received by the receiving module. The setting module is configured to set a time tag for the data added by the adding module to the cache, and the second clearing module is configured to clear expired data from the cache area of the API management device according to the time tag set by the setting module after a preset time is reached.

A fourth aspect of the present disclosure provides an API management device, including a receiving module configured to receive an API call request that a user terminal is triggered, to send when a user uses an APP, where the API call request carries an identifier of the APP and an identifier of a subscriber category of the APP, an acquiring module configured to acquire, according to the identifier of the APP and the identifier of the subscriber category of the APP that are received by the receiving module, a QoS control policy that is of the APP and corresponding to the subscriber category of the APP, and a control module configured to control, QoS of the user according to the QoS control policy that is of the APP and acquired by the acquiring module.

With reference to the fourth aspect, in a first possible implementation manner, the acquiring module is further configured to acquire, from the cache data, the QoS control policy that is of the APP and corresponding to the subscriber category of the APP if cache data of a correspondence between a subscriber category of the APP and a QoS control policy of the APP exists in a cache area of the API management device, or acquire, from the correspondence that is between a subscriber category of the APP and a QoS control policy of the APP and already stored in a non-cache area, the QoS control policy that is of the APP and corresponding to the subscriber category of the APP if cache data of a correspondence between a subscriber category of the APP and a QoS control policy of the APP does not exist in a cache area of the API management device.

With reference to the fourth aspect, in a second possible implementation manner, the acquiring module is further configured to acquire, from the cache data, the QoS control policy that is of the APP and corresponding to the subscriber category of the APP if cache data of a correspondence between a subscriber category of the APP and a QoS control policy of the APP exists in a cache area of the API management device, or send a search request to an APP server if cache data of a correspondence between a subscriber category of the APP and a QoS control policy of the APP does not exist in a cache area of the API management device, where the search request carries the identifier of the subscriber category of the APP, and the identifier of the subscriber category of the APP is used by the APP server to search for the QoS control policy that is of the APP and corresponding to the subscriber category of the APP, and receive a search response message sent by the APP server, where the search response message carries the QoS control policy that is of the APP and corresponding to the subscriber category of the APP.

In addition, it should be noted that the fourth aspect of the embodiments of the present disclosure further provides multiple implementation solutions of buffering, confirmation, and clearing in the ninth to the twelfth possible implementation manners of the third aspect, reference may be made to the solutions of buffering, confirmation, and clearing in the ninth to the twelfth possible implementation manners of the third aspect for understanding, and details are not described herein again.

A solution of determining a QoS control policy using an identifier of a subscriber category according to this embodiment of the present disclosure may be used in a local area network or a securely isolated DMZ in a network environment. The identifier of the subscriber category is directly carried in a request in a plaintext form, and there may be or may not be a user identifier. Alternatively, during network transmission, the identifier of the subscriber category may be directly carried in a request in a ciphertext form, and there may be or may not be a user identifier. The identifier of the subscriber category is directly carried in a request in a plaintext or ciphertext form, and there may be or may not be a user identifier.

A fifth aspect of the present disclosure provides a system for controlling QoS, including a user terminal and an API management device, where the API management device is the foregoing API management device described in the third aspect.

A sixth aspect of the present disclosure provides a system for controlling QoS, including a user terminal and an API management device, where the API management device is the foregoing API management device described in the fourth aspect.

In the embodiments of the present disclosure, an API management device that provides an open API for an APP receives an API call request that a user terminal is triggered to send when the APP is being used, where the API call request carries a user identifier of the APP and an identifier of the APP, acquires a QoS control policy of the APP according to the identifier of the APP and the user identifier of the APP, and controls, according to the QoS control policy of the APP, QoS of a user indicated by the user identifier. In the other approaches, an APP developer needs to develop a set of QoS management functions. By comparison, according to the method for controlling QoS provided in the embodiments of the present disclosure, QoS control can be provided for an APP that registers with the API management device, which improves the APP development efficiency. In addition, an APP developer needs to perform simple configuration only when an API is registered. Therefore, requirements on experience and skills of the APP developer are further reduced, which lowers a threshold for the APP developer, and an APP development and test period is shortened such that an APP is put into market more quickly and gets a head start in a market.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person skilled in the art may still derive other drawings from these accompanying drawings without creative efforts.

DESCRIPTION OF EMBODIMENTS

Figure 1:
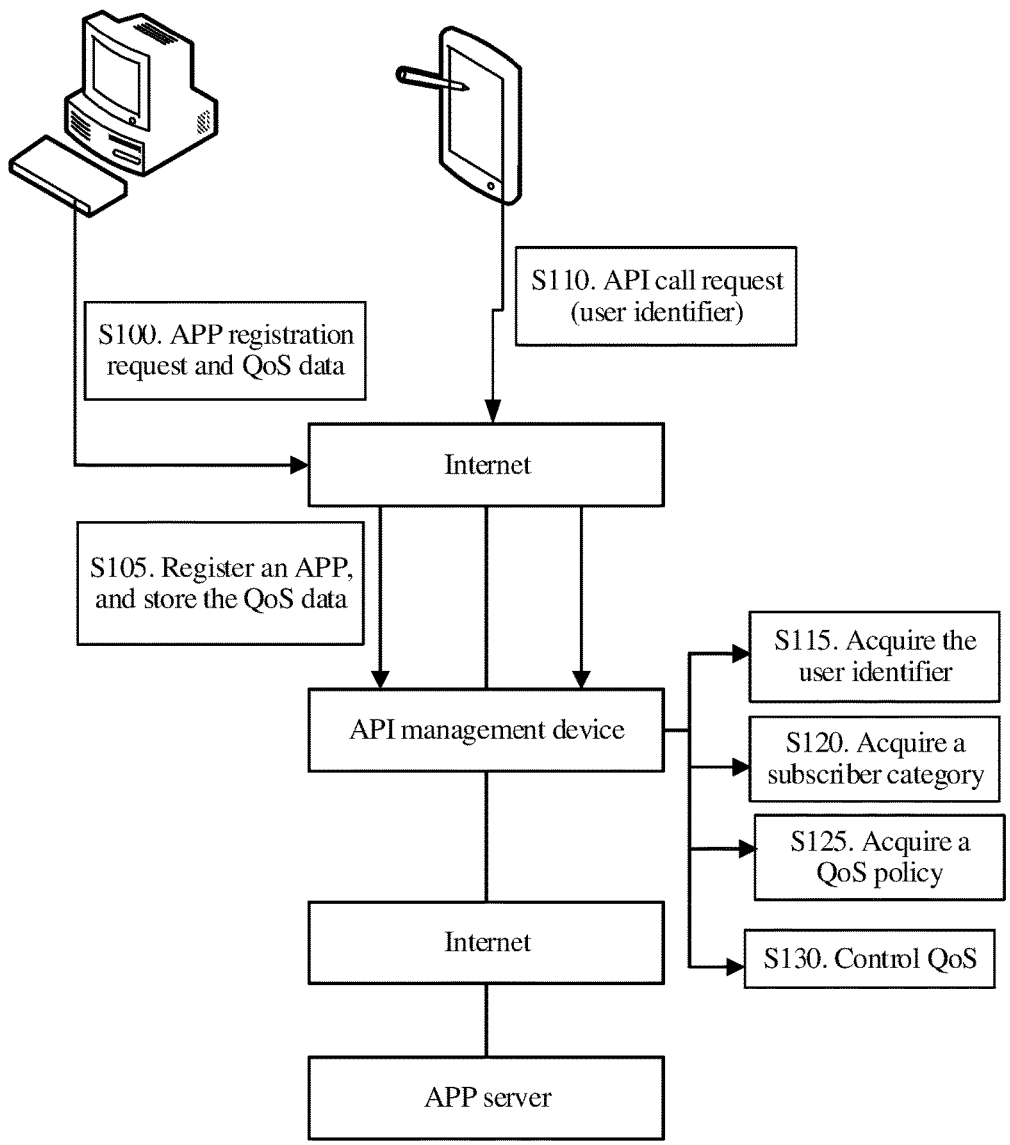
FIG. 1 is a schematic diagram of an embodiment of a method for controlling QoS in an embodiment of the present disclosure.

Embodiments of the present disclosure provide a method for controlling QoS, which can provide QoS control for an APP that registers with an API management device, and improve the APP development efficiency. The embodiments of the present disclosure further provide a corresponding device and system. The following provides detailed descriptions separately.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

The embodiments of the present disclosure provide, based on an API management device, a method for controlling QoS of an APP user on the API management device. An APP developer configures a QoS control policy of an APP for each user identifier, and stores the QoS control policy in an API management device or an APP server. An API call request initiated when a user uses the APP using a user terminal carries an identifier of the APP and a user identifier of the APP, that is, the user terminal is triggered to send the API call request to the API management device when the APP is being used. The API management device acquires the identifier of the APP and the user identifier of the APP, searches for a QoS control policy corresponding to the user identifier of the APP, and performs QoS management and control according to the QoS control policy. The identifier of the APP refers to an identifier that can uniquely indicate the APP, and the identifier of the APP may be represented using a character, for example, an identifier of WeChat or an identifier of a navigation application. The user identifier of the APP refers to an identifier that can indicate the user of the APP, and a user name of the APP may be used as the user identifier of the APP. For example, for a WECHAT account registered using a mobile phone number, the mobile phone number is a user identifier of WECHAT, or for a TAOBAO account registered using an email address, the email address is a user identifier of TAOBAO.

In order to protect a backend APP server, service-level agreements (SLA) at API and APP levels are provided. When registering an APP with an API management device, an APP developer needs to set SLA control for the APP, that is, control over an SLA of the APP when the APP is an object, for example, a quantity of API call times allowed per unit of time. A same APP may be used by multiple users simultaneously. Because an SLA of the APP exists, and the SLA of the APP is a limited resource, the multiple users may contend for the SLA of the APP. Therefore, an APP supports that a user obtains different QoS experience in a manner of a package, a subscriber category, or the like when purchasing an APP service. The subscriber category refers to a service access priority of a user. For example, the subscriber category may include a very important person (VIP) subscriber, a gold subscriber, a silver subscriber, and a bronze subscriber, where the VIP subscriber is a highest subscriber category, and is successively followed by the gold subscriber, the silver subscriber, and the bronze subscriber. Different subscriber categories are corresponding to different QoS packages, and each QoS package is corresponding to a different QoS control policy. For an APP, QoS of a VIP subscriber is preferentially protected, and users of a same category use the APP as fairly as possible. A QoS management function needs to be provided for a user, an SLA is maintained for each user, and QoS control is performed for users of different categories.

Further, the present disclosure provides, based on an API management device, a method for controlling QoS of an APP user on the API management device. An APP developer configures a relationship between a user identifier and a subscriber category of an APP, a subscriber category of the APP, and a QoS control policy at a corresponding level, and stores, in an API management device or an APP server, the relationship between a user identifier and a subscriber category of the APP, the subscriber category of the APP, and the QoS control policy at the corresponding level. An API call request initiated when a user uses the APP using a user terminal carries an identifier of the APP and a user identifier of the APP, that is, the user terminal is triggered to send the API call request to the API management device when the APP is being used. The API management device acquires the identifier of the APP and the user identifier of the APP, searches for the subscriber category of the APP and the QoS control policy at the corresponding level, and performs QoS management and control according to the QoS control policy.

In this way, a task of developing a set of subscriber categories and QoS management originally by an APP developer is implemented by an API management device, and the APP developer needs to configure only a corresponding subscriber category of an APP and a QoS control policy at a corresponding level when an API is registered. Therefore, the APP development efficiency is improved, and an APP development period is shortened.

For ease of understanding, a simple example is described herein.

The subscriber category of the APP and the QoS control policy at the corresponding level may be configured as follows.

APP SLA quota: 1000 times/minute;

Gold subscriber: 100 times/minute, a rate limited at 1000 kilobits per second (kbps), and a direction: uplink/downlink;

Silver subscriber: 10 times/minute, a rate limited at 100 kbps, and a direction: uplink/downlink; and Bronze subscriber: one time/minute, a rate limited at 10 kbps, and a direction: uplink/downlink.

Application examples of the subscriber category of the APP and the QoS control policy at the corresponding level may be as follows.

Initial Reservation:

500 times: reserved for a gold subscriber;

400 times: reserved for a silver subscriber;

100 times: reserved for a bronze subscriber;

Users of a same category contend with each other; and

A user of a higher category is allowed to occupy a quota for a user of a lower category after using up a quota.

In the embodiments of the present disclosure, a full-hosting scenario, a semi-hosting scenario, and a weak hosting scenario may be included. The full-hosting scenario means that both a subscriber category of an APP and a QoS control policy at a corresponding level are hosted on an API management device, the semi-hosting scenario means that one of a subscriber category of an APP and a QoS control policy at a corresponding level is hosted on an API management device, and the weak hosting scenario means that a subscriber category of an APP and a QoS control policy at a corresponding level are stored in an APP server and are not hosted on an API management device. In each scenario, the API management device communicates with an APP server over the Internet such that the API server completes a function such as charging.

Further, the subscriber category of the APP and the QoS control policy at the corresponding level are a correspondence between a user identifier of the APP and a subscriber category of the APP and a correspondence between a subscriber category of the APP and a QoS control policy of the APP. The two correspondences may be recorded in a form of one correspondence table or two correspondence tables, or a user identifier of the APP and a QoS control policy that is of the APP and corresponding to the user identifier may be directly recorded in one correspondence table. These correspondence tables are made by an APP development manager, and these correspondence tables are configured and stored on the API management device when the APP registers with the API management device, or one of the correspondence tables is configured and stored on the API management device, or the two correspondence tables are configured and stored on the APP server. The three cases are respectively corresponding to the full-hosting scenario, the semi-hosting scenario, and the weak hosting scenario.

With reference to accompanying drawings, the following separately describes QoS control processes in the full-hosting scenario, the semi-hosting scenario, and the weak hosting scenario.

FIG. 1 is a schematic diagram of a full-hosting scenario in an embodiment of the present disclosure. As shown in FIG. 1, in the full-hosting scenario, an embodiment of a method for controlling QoS provided in this embodiment of the present disclosure includes the following steps.

Step S100: After developing an APP, an APP developer sends an APP registration request and QoS data to an API management device using user equipment used by the APP developer.

The QoS data in this embodiment of the present disclosure includes a subscriber category of the APP and a QoS control policy at a corresponding level, which are a correspondence between a user identifier of the APP and a subscriber category of the APP and a correspondence between a subscriber category of the APP and a QoS control policy of the APP.

Step S105: The API management device registers the APP according to the registration request, and stores, in the API management device, a correspondence between a user identifier of the APP and a subscriber category of the APP and a correspondence between a subscriber category of the APP and a QoS control policy of the APP.

Step S110: The API management device receives an API call request that a user terminal is triggered, to send when the APP is being used, where the API call request carries a user identifier of the APP and an identifier of the APP.

Step S115: The API management device acquires the user identifier of the APP and the identifier of the APP from the API call request.

There are two manners of carrying the user identifier. In a first manner, in a scenario in which authentication is performed on the APP by an API management platform, the API management device uses a user name for logging in to the APP as the user identifier of the APP when authentication is being performed on a user.

In a second manner, in a scenario in which authentication is not performed on the APP by the API management device, a user identifier field agreed on between both parties is added to an API call request initiated by the APP. A Hypertext Transfer Protocol (HTTP) Restful interface is used as an example. The user identifier may be stored in a uniform resource locator (URL), a header, or a body of a message.

Step S120: Acquire, from the correspondence that is between a user identifier of the APP and a subscriber category of the APP and stored in the API management device, a subscriber category that is of the APP and corresponding to the user identifier of the APP.

Step S125: Acquire, from the correspondence that is between a subscriber category of the APP and a QoS control policy of the APP and stored in the API management device, a QoS control policy that is of the APP and corresponding to the subscriber category of the APP.

Step S130: Control, according to the QoS control policy of the APP, QoS of a user indicated by the user identifier.

In other approaches, an APP developer needs to develop a set of SLAs and QoS management functions for a user. By comparison, according to the method for controlling QoS provided in this embodiment of the present disclosure, QoS control can be provided for an APP that registers with an API management device, which improves the APP development efficiency.

Actually, in the full-hosting scenario, alternatively, after the user identifier is acquired, a cache area may be first checked. If the correspondence between a user identifier of the APP and a subscriber category of the APP and the correspondence between a subscriber category of the APP and a QoS control policy of the APP are stored in the cache area, a QoS control policy is directly determined from the cache area for QoS control. When the correspondence between a user identifier of the APP and a subscriber category of the APP and the correspondence between a subscriber category of the APP and a QoS control policy of the APP are not stored in the cache area, the correspondence between a user identifier of the APP and a subscriber category of the APP and the correspondence between a subscriber category of the APP and a QoS control policy of the APP are then acquired from a local storage of the API management device. In this way, if the correspondence between a user identifier of the APP and a subscriber category of the APP and the correspondence between a subscriber category of the APP and a QoS control policy of the APP may be directly acquired from the cache area, a QoS control speed can be improved. The correspondence between a user identifier of the APP and a subscriber category of the APP and the correspondence between a subscriber category of the APP and a QoS control policy of the APP are definitely not stored in the cache area if the APP is enabled by the user for the first time, and the correspondence between a user identifier of the APP and a subscriber category of the APP and the correspondence between a subscriber category of the APP and a QoS control policy of the APP need to be acquired from another storage device of the API management device, that is, a non-cache area. After being acquired, the correspondence between a user identifier of the APP and a subscriber category of the APP and the correspondence between a subscriber category of the APP and a QoS control policy of the APP need to be stored in the cache area of the API management device such that the correspondences can be directly acquired from the cache area in a next search, which improves a QoS control speed.

Figure 2:
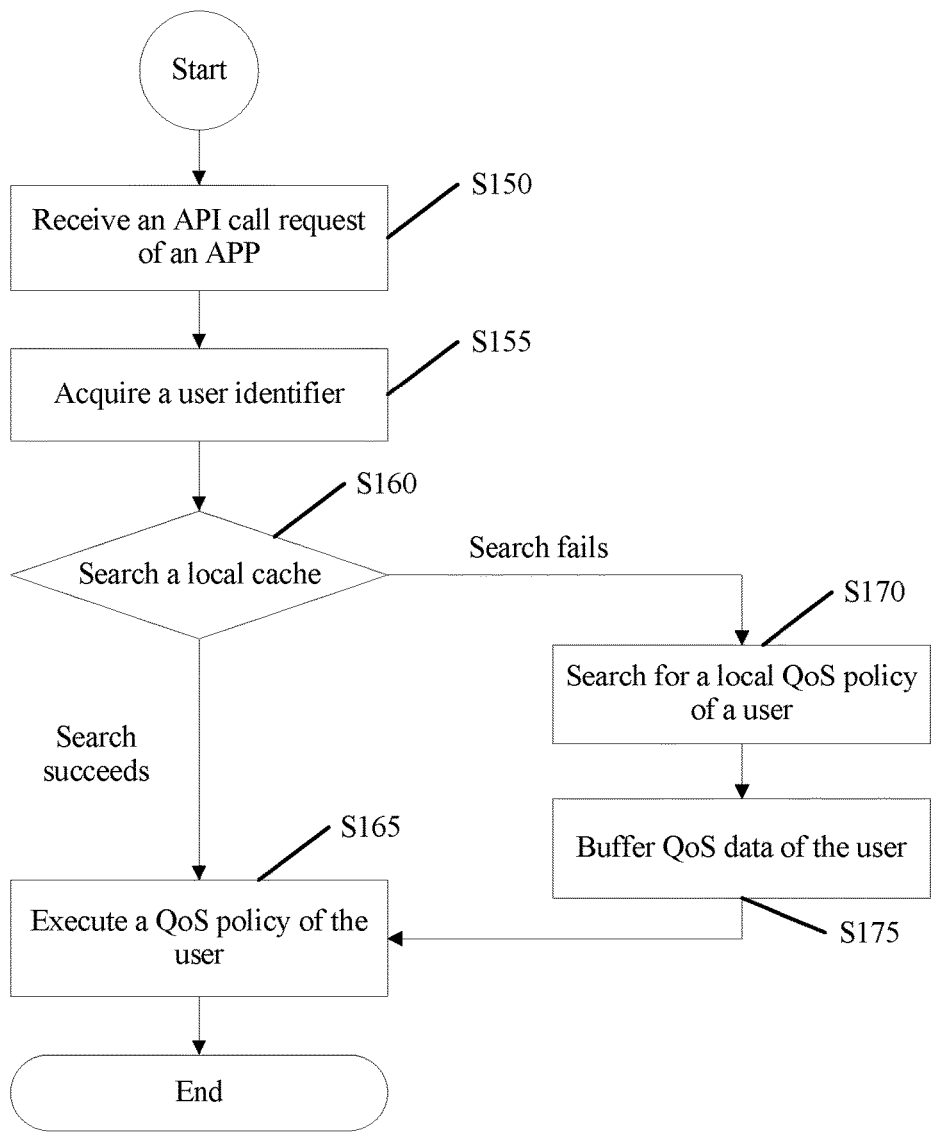
FIG. 2 is a schematic diagram of another embodiment of a method for controlling QoS in an embodiment of the present disclosure.

For an embodiment of a method for controlling QoS in which a search in a cache area is added, reference may be made to FIG. 2 for understanding. FIG. 2 may include the following steps.

Step S150: An API management device receives an API call request of an APP, where the API call request carries a user identifier of the APP and an identifier of the APP.

Step S155: The API management device acquires the identifier of the APP and the user identifier of the APP.

Step S160: Search, according to the user identifier, a cache area of the API device for a QoS control policy corresponding to the user identifier, and perform step S165 if the search succeeds, or perform step S170 if the search fails.

Step S165: Execute the QoS control policy to control QoS of a user indicated by the user identifier when the search succeeds.

Step S170: Search a non-cache area of the API management device for a subscriber category corresponding to the user identifier and the QoS control policy corresponding to the subscriber category when the search fails.

Step S175: Buffer a correspondence between a user identifier of the APP and a subscriber category of the APP and a correspondence between a subscriber category of the APP and a QoS control policy of the APP.

In addition, the API management device clears data of the user in the cache area in time in order to relieve pressure on the cache area and improve a running speed after receiving an offline request.

Certainly, alternatively, clearing may be not performed in time. Instead, when data of the user is generated when the APP runs, and the data is added to the cache area, a timestamp is recorded, and the API management device periodically performs aging on data in the cache area, configures an aging period for the data in the cache area, performs aging determining by comparing recorded timestamps, and clears an aged cache area record.

In addition, it should be noted that, alternatively, the subscriber category of the APP may be acquired from the cache area, and the QoS control policy of the APP may be acquired from the non-cache area or an APP server.

Figure 3:
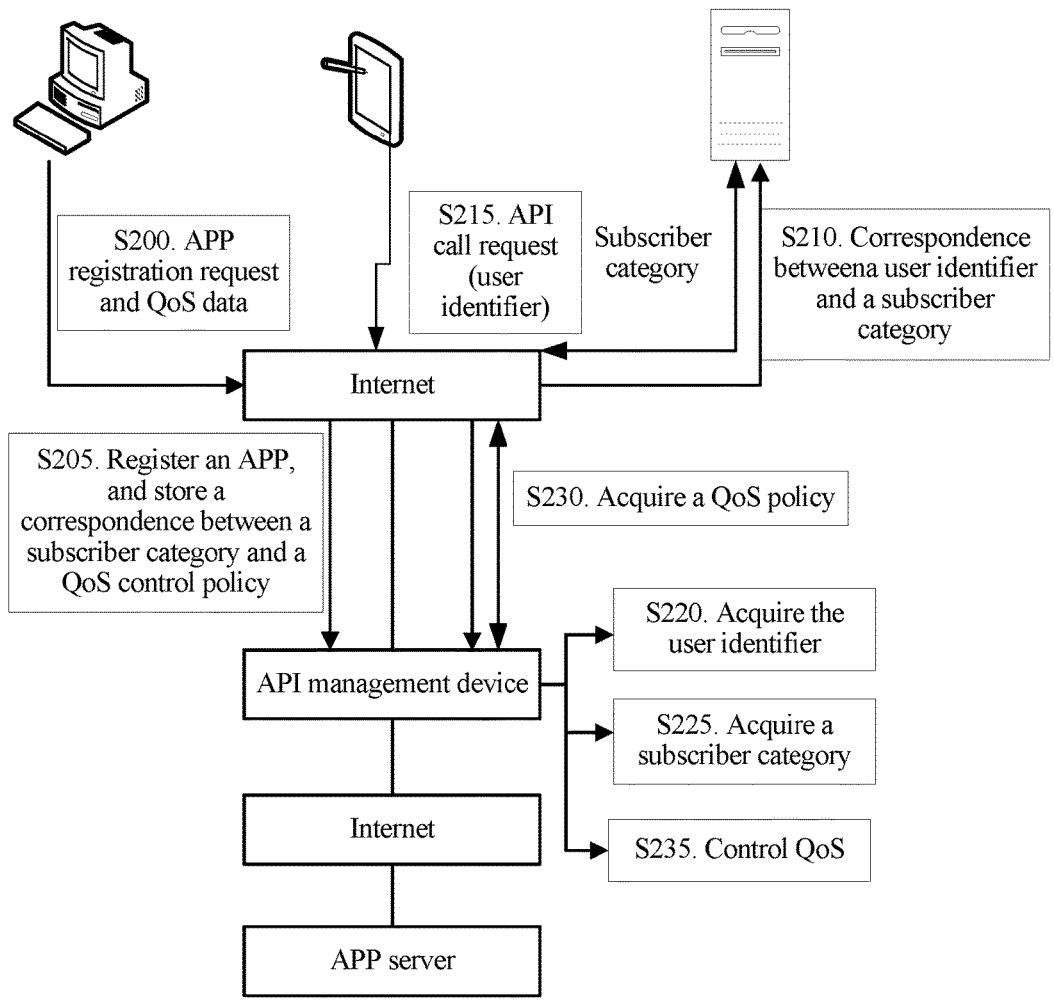
FIG. 3 is a schematic diagram of another embodiment of a method for controlling QoS in an embodiment of the present disclosure.

FIG. 3 is a schematic diagram of a semi-hosting scenario in an embodiment of the present disclosure. As shown in FIG. 3, in the semi-hosting scenario, an embodiment of a method for controlling QoS provided in this embodiment of the present disclosure includes the following steps.

Step S200: After developing an APP, an APP developer sends an APP registration request, QoS data, and a first search indication identifier to an API management device using user equipment used by the APP developer.

The QoS data in this embodiment of the present disclosure includes a subscriber category of the APP and a QoS control policy at a corresponding level, which are a correspondence between a user identifier of the APP and a subscriber category of the APP and a correspondence between a subscriber category of the APP and a QoS control policy of the APP.

The first search indication identifier is used to indicate a necessity of searching an APP server for the correspondence between a user identifier of the APP and a subscriber category of the APP.

In this embodiment of the present disclosure, the correspondence between a subscriber category of the APP and a QoS control policy of the APP is stored in the API management device, and the correspondence between a user identifier of the APP and a subscriber category of the APP is stored in the APP server. Actually, the correspondence between a subscriber category of the APP and a QoS control policy of the APP may be stored in the APP server, and the correspondence between a user identifier of the APP and a subscriber category of the APP may be stored in the API management device.

Step S205: The API management device registers the APP according to the registration request, and stores the first search indication identifier and a correspondence between a subscriber category of the APP and a QoS control policy of the APP.

Step S210: An APP server stores a correspondence between a user identifier of the APP and a subscriber category of the APP.

Step S215: The API management device receives an API call request that a user terminal is triggered, to send when a user uses the APP, where the API call request carries an identifier of the APP and a user identifier of the APP.

Step S220: The API management device acquires the identifier of the APP and the user identifier of the APP from the API call request.

There are two manners of carrying the user identifier. In a first manner, in a scenario in which authentication is performed on the APP by an API management platform, the API management device uses a user name for logging in to the APP as the user identifier of the APP when authentication is being performed on the user.

In a second manner, in a scenario in which authentication is not performed on the APP by the API management device, a user identifier field agreed on between both parties is added to an API call request initiated by the APP. An HTTP Restful interface is used as an example. The user identifier may be stored in a URL, a header, or a body of a message.

Step S225: Acquire, from the correspondence that is between a user identifier of the APP and a subscriber category of the APP and stored in the API management device, a subscriber category that is of the APP and corresponding to the user identifier of the APP.

Step S230: Send a search request to the APP server, where the search request carries the user identifier of the APP, and the user identifier of the APP is used by the APP server to search for the subscriber category corresponding to the user identifier, and receive a search response message sent by the APP server, where the search response message carries the subscriber category of the APP.

If the API management device receives a second search indication identifier, where the second search indication identifier is used to indicate a necessity of searching an APP server for the correspondence between a subscriber category of the APP and a QoS control policy of the APP, it indicates that the correspondence between a subscriber category of the APP and a QoS control policy of the APP is stored in the APP server, and the correspondence between a user identifier of the APP and a subscriber category of the APP is stored in the API management device. A subscriber category that is of the APP and corresponding to a user identifier of the APP may be acquired from the correspondence that is between a user identifier of the APP and a subscriber category of the APP and stored in the API management device, and a search request may be sent to the APP server, where the search request carries the subscriber category of the APP, and the subscriber category of the APP is used by the APP server to search for a QoS control policy that is of the APP and corresponding to the subscriber category of the APP.

Step S235: Control, according to a QoS control policy of the APP, QoS of the user indicated by the user identifier.

In other approaches, an APP developer needs to develop a set of SLAs and QoS management functions for a user. By comparison, according to the method for controlling QoS provided in this embodiment of the present disclosure, QoS control can be provided for an APP that registers with an API management device, which improves the APP development efficiency.

In the semi-hosting scenario, alternatively, a cache area may be first checked after the user identifier of the APP is acquired. A QoS control policy is directly determined from the cache area for QoS control if the correspondence between a user identifier of the APP and a subscriber category of the APP and the correspondence between a subscriber category of the APP and a QoS control policy of the APP are stored in the cache area. If the correspondence between a user identifier of the APP and a subscriber category of the APP, a subscriber category of the APP, and a QoS control policy of the APP are not stored in the cache area, the correspondence between a user identifier of the APP and a subscriber category of the APP, the subscriber category of the APP, and the QoS control policy of the APP are then acquired from a local storage or the APP server. In this way, if the correspondence between a user identifier of the APP and a subscriber category of the APP, the subscriber category of the APP, and the QoS control policy of the APP may be directly acquired from the cache area, a QoS control speed can be improved. If the APP is enabled by the user for the first time, the correspondence between a user identifier of the APP and a subscriber category of the APP, the subscriber category of the APP, and the QoS control policy of the APP are definitely not stored in the cache area, and the correspondence between a user identifier of the APP and a subscriber category of the APP, the subscriber category of the APP, and the QoS control policy of the APP need to be acquired from another storage device of the API management device, that is, a non-cache area or an APP server. After being acquired, the correspondence between a user identifier of the APP and a subscriber category of the APP, the subscriber category of the APP, and the QoS control policy of the APP need to be stored in the cache area of the API device such that the correspondence between a user identifier of the APP and a subscriber category of the APP, the subscriber category of the APP, and the QoS control policy of the APP can be directly acquired from the cache area in a next search, which improves a QoS control speed. For a process of searching the cache area, reference may be made to descriptions in FIG. 2 for understanding, but the subscriber category corresponding to the user identifier or the QoS control policy corresponding to the subscriber category in step S170 in FIG. 2 may be obtained by searching the APP server.

In addition, after receiving an offline request, the API management device clears data of the user in the cache area in time in order to relieve pressure on the cache area and improve a running speed.

Certainly, alternatively, clearing may be not performed in time. Instead, when data of the user is generated when the APP runs, and the data is added to the cache area, a timestamp is recorded, and the API management device periodically performs aging on data in the cache area, configures an aging period for the data in the cache area, performs aging determining by comparing recorded timestamps, and clears an aged cache area record.

In addition, it should be noted that, alternatively, the subscriber category of the APP may be acquired from the cache area, and the QoS control policy of the APP may be acquired from the non-cache area or the APP server.

Figure 4:
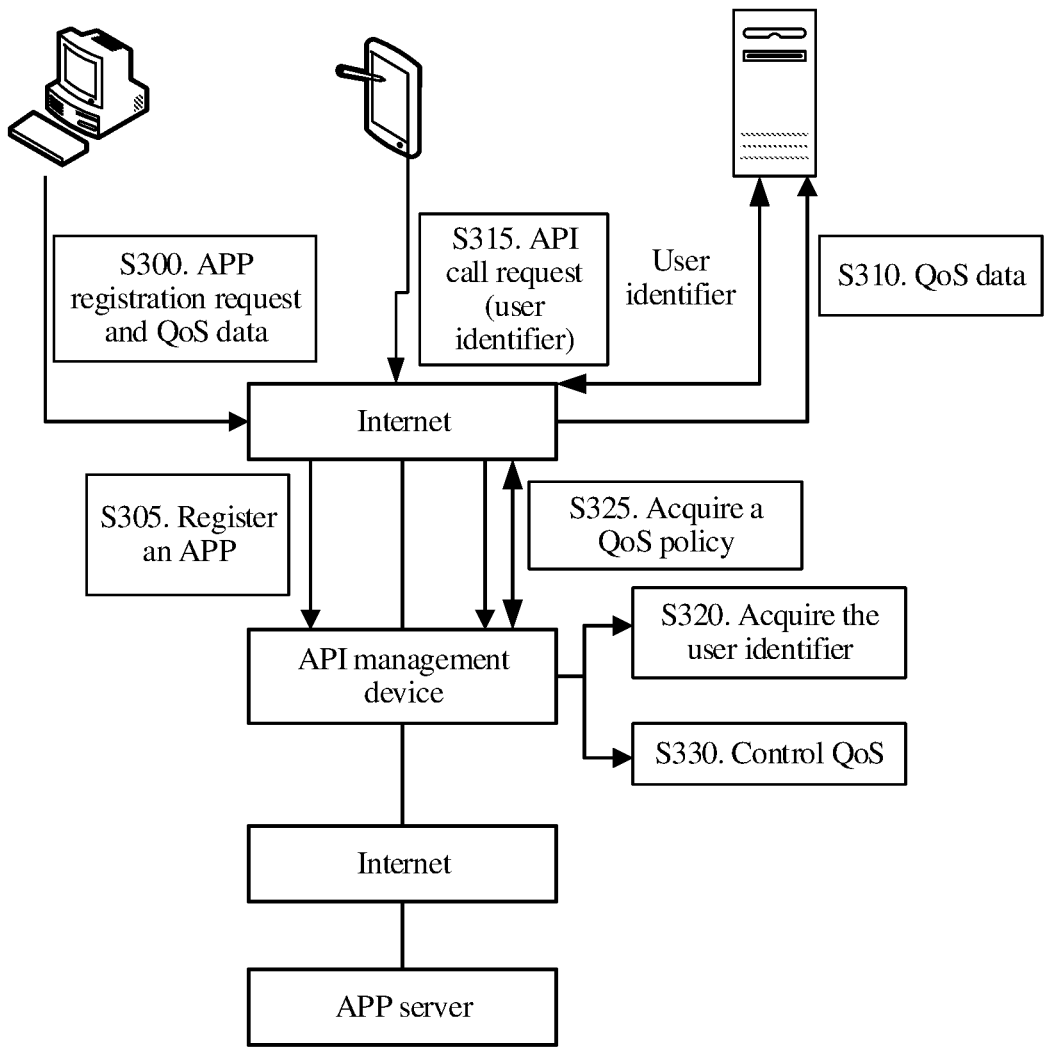
FIG. 4 is a schematic diagram of another embodiment of a method for controlling QoS in an embodiment of the present disclosure.

FIG. 4 is a schematic diagram of a weak hosting scenario in an embodiment of the present disclosure. As shown in FIG. 4, in the weak hosting scenario, an embodiment of a method for controlling QoS provided in this embodiment of the present disclosure includes the following steps.

Step S300: After developing an APP, an APP developer sends an APP registration request and QoS data to an API management device using user equipment used by the APP developer.

The QoS data in this embodiment of the present disclosure includes a subscriber category of the APP and a QoS control policy at a corresponding level, which are a correspondence between a user identifier of the APP and a subscriber category of the APP and a correspondence between a subscriber category of the APP and a QoS control policy of the APP.

In this embodiment of the present disclosure, both the correspondence between a user identifier of the APP and a subscriber category of the APP and the correspondence between a subscriber category of the APP and a QoS control policy of the APP are stored in an APP server.

Step S305: The API management device registers the APP according to the registration request.

Step S310: An APP server stores a correspondence between a user identifier of the APP and a subscriber category of the APP and a correspondence between a subscriber category of the APP and a QoS control policy of the APP.

Step S315: The API management device receives an API call request that a user terminal is triggered, when the APP is being used, to send, where the API call request carries a user identifier of the APP and an identifier of the APP.

Step S320: The API management device acquires the identifier and the user identifier of the APP from the API call request.

There are two manners of carrying the user identifier. In a first manner, in a scenario in which authentication is performed on the APP by an API management platform, the API management device uses a user name for logging in to the APP as the user identifier when authentication is being performed on the user.

In a second manner, in a scenario in which authentication is not performed on the APP by the API management device, a user identifier field agreed on between both parties is added to an API call request initiated by the APP. An HTTP Restful interface is used as an example. The user identifier may be stored in a URL, a header, or a body of a message.

Step S325: Send a search request to the APP server, where the search request carries the user identifier of the APP, and the user identifier is used by the APP server to search for a subscriber category that is of the APP and corresponding to the user identifier of the APP and a QoS control policy that is of the APP and corresponding to the subscriber category of the APP, and receive a search response message sent by the APP server, where the search response message carries the QoS control policy of the APP.

Step S330: Control, according to the QoS control policy of the APP, QoS of a user indicated by the user identifier.

In other approaches, an APP developer needs to develop a set of SLAs and QoS management functions for a user. By comparison, according to the method for controlling QoS provided in this embodiment of the present disclosure, QoS control can be provided for an APP that registers with an API management device, which improves the APP development efficiency.

Actually, in the weak hosting scenario, alternatively, after the user identifier is acquired, a cache area may be first checked. A QoS control policy is directly determined from the cache area for QoS control if the correspondence between a user identifier of the APP and a subscriber category of the APP and the correspondence between a subscriber category of the APP and a QoS control policy of the APP are stored in the cache area. When the correspondence between a user identifier of the APP and a subscriber category of the APP and the correspondence between a subscriber category of the APP and a QoS control policy of the APP are not stored in the cache area, the correspondence between a user identifier of the APP and a subscriber category of the APP and the correspondence between a subscriber category of the APP and a QoS control policy of the APP are then acquired from the APP server. In this way, if the correspondence between a user identifier of the APP and a subscriber category of the APP and the correspondence between a subscriber category of the APP and a QoS control policy of the APP may be directly acquired from the cache area, a QoS control speed can be improved. If the APP is enabled by the user for the first time, the correspondence between a user identifier of the APP and a subscriber category of the APP and the correspondence between a subscriber category of the APP and a QoS control policy of the APP are definitely not stored in the cache area, and the correspondence between a user identifier of the APP and a subscriber category of the APP and the correspondence between a subscriber category of the APP and a QoS control policy of the APP need to be acquired from the APP server. After being acquired, the correspondence between a user identifier of the APP and a subscriber category of the APP and the correspondence between a subscriber category of the APP and a QoS control policy of the APP need to be stored in the cache area of the API device such that the correspondences can be directly acquired from the cache area in a next search, which improves a QoS control speed. For a process of searching the cache area, reference may be made to descriptions in FIG. 2 for understanding, but the subscriber category corresponding to the user identifier and the QoS control policy corresponding to the subscriber category in step S170 may be obtained by searching the APP server.

In addition, after receiving an offline request, the API management device clears data of the user in the cache area in time in order to relieve pressure on the cache area and improve a running speed.

Certainly, alternatively, clearing may be not performed in time. Instead, when data of the user is generated when the APP runs, and the data is added to the cache area, a timestamp is recorded, and the API management device periodically performs aging on data in the cache area, configures an aging period for the data in the cache area, performs aging determining by comparing recorded timestamps, and clears an aged cache area record.

It should be noted that in addition to the foregoing several hosting manners, both the correspondence between a user identifier and a subscriber category and the correspondence between a subscriber category and a QoS control policy may be stored in the API management device and the APP server.

Figure 5:
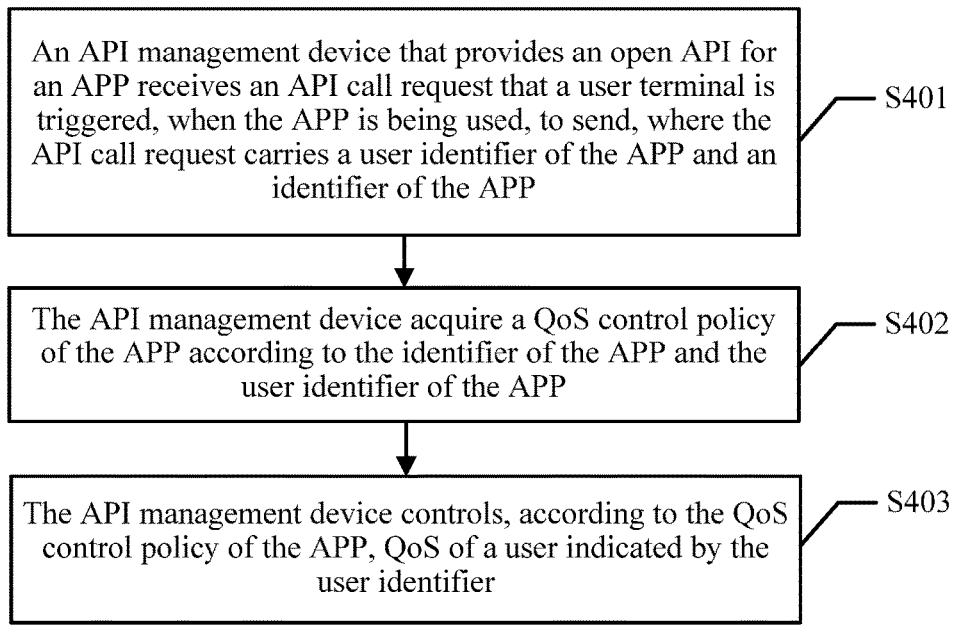
FIG. 5 is a schematic diagram of another embodiment of a method for controlling QoS in an embodiment of the present disclosure.

FIG. 5 is a schematic diagram of an embodiment of a method for controlling QoS in an embodiment of the present disclosure. As shown in FIG. 5, the embodiment of the method for controlling QoS in this embodiment of the present disclosure includes the following steps.

Step S401: An API management device that provides an open API for an APP receives an API call request that a user terminal is triggered, when the APP is being used, to send, where the API call request carries a user identifier of the APP and an identifier of the APP.

Step S402: The API management device acquires a QoS control policy of the APP according to the identifier of the APP and the user identifier of the APP.

Step S403: The API management device controls, according to the QoS control policy of the APP, QoS of a user indicated by the user identifier.

In this embodiment of the present disclosure, an API management device that provides an open API for an APP receives an API call request that a user terminal is triggered, when the APP is being used, to send, where the API call request carries a user identifier of the APP and an identifier of the APP, acquires a QoS control policy of the APP according to the identifier of the APP and the user identifier of the APP, and controls, according to the QoS control policy of the APP, QoS of a user indicated by the user identifier. In other approaches, an APP developer needs to develop a set of QoS management functions for a user. By comparison, according to the method for controlling QoS provided in this embodiment of the present disclosure, QoS control can be provided for an APP that registers with an API management device, which improves the APP development efficiency. In addition, an APP developer needs to perform simple configuration only when an API is registered. Therefore, requirements on experience and skills of the APP developer are further reduced, which lowers a threshold for the APP developer, and an APP development and test period is shortened such that an APP is put into market more quickly and gets a head start in a market.

Optionally, based on the foregoing embodiment corresponding to FIG. 5, in a first optional embodiment of the method for controlling QoS provided in this embodiment of the present disclosure, acquiring a QoS control policy of the APP according to the identifier of the APP and the user identifier of the APP may include acquiring, according to the identifier of the APP and the user identifier of the APP, a subscriber category that is of the APP and corresponding to the user identifier of the APP, and acquiring, according to the subscriber category of the APP, the QoS control policy that is of the APP and corresponding to the subscriber category of the APP.

This embodiment of the present disclosure is a solution when the subscriber category is provided.

Optionally, based on the foregoing first optional embodiment corresponding to FIG. 5, in a second optional embodiment of the method for controlling QoS provided in this embodiment of the present disclosure, before receiving an API call request that a user terminal is triggered, when the APP is being used, to send, the method may further include receiving a registration request of the APP, and receiving a correspondence between a user identifier of the APP and a subscriber category of the APP and a correspondence between a subscriber category of the APP and a QoS control policy of the APP, and registering the APP according to the registration request, and storing, in the API management device, the correspondence between a user identifier of the APP and a subscriber category of the APP and the correspondence between a subscriber category of the APP and a QoS control policy of the APP.

This embodiment of the present disclosure is a QoS control solution in a full-hosting scenario. Both the correspondence between a user identifier and a subscriber category and the correspondence between a subscriber category and a QoS control policy may be hosted on the API management device, which can improve the API call efficiency.

Optionally, based on the foregoing second optional embodiment corresponding to FIG. 5, in a third optional embodiment of the method for controlling QoS provided in this embodiment of the present disclosure, acquiring, according to the identifier of the APP and the user identifier of the APP, a subscriber category that is of the APP and corresponding to the user identifier of the APP may include acquiring, from the cache data, the subscriber category that is of the APP and corresponding to the user identifier of the APP if cache data of the correspondence between a user identifier of the APP and a subscriber category of the APP exists in a cache area of the API management device, or acquiring, from the correspondence that is between a user identifier of the APP and a subscriber category of the APP and already stored in the non-cache area, the subscriber category that is of the APP and corresponding to the user identifier of the APP if cache data of the correspondence between a user identifier of the APP and a subscriber category of the APP does not exist in a cache area of the API management device, and correspondingly, acquiring, according to the subscriber category of the APP, the QoS control policy that is of the APP and corresponding to the subscriber category of the APP includes acquiring, from the cache area, the QoS control policy that is of the APP and corresponding to the subscriber category of the APP when the subscriber category of the APP is acquired from the cache area, or acquiring, from the non-cache area, the QoS control policy that is of the APP and corresponding to the subscriber category of the APP when the subscriber category of the APP is acquired from the non-cache area.

In this embodiment of the present disclosure, the cache area is set on the API management device. If being stored in the cache area, the correspondence between a user identifier of the APP and a subscriber category of the APP and the correspondence between a subscriber category of the APP and a QoS control policy of the APP are directly acquired from the cache area, which can improve QoS control efficiency. The correspondences are acquired from the non-cache area of the API management device if being not stored in the cache area.

In addition, after acquiring, from the non-cache area, the QoS control policy that is of the APP and corresponding to the subscriber category of the APP, the method further includes storing, in the cache area of the API management device, the correspondence between a user identifier of the APP and a subscriber category of the APP and the correspondence between a subscriber category of the APP and a QoS control policy of the APP.

That is, after being acquired from the non-cache area, the correspondence between a user identifier of the APP and a subscriber category of the APP and the correspondence between a subscriber category of the APP and a QoS control policy of the APP are stored in the cache area such that the correspondences can be quickly acquired when the same APP is being used next time.

Optionally, based on the foregoing first optional embodiment corresponding to FIG. 5, in a fourth optional embodiment of the method for controlling QoS provided in this embodiment of the present disclosure, before receiving an API call request that a user terminal is triggered, when the APP is being used, to send, the method may further include receiving a registration request of the APP, and receiving a first search indication identifier and a correspondence between a subscriber category of the APP and a QoS control policy of the APP, where the first search indication identifier is used to indicate a necessity of searching an APP server for a correspondence between a user identifier of the APP and a subscriber category of the APP, and registering the APP according to the registration request, and storing, in the API management device, the first search indication identifier and the correspondence between a subscriber category of the APP and a QoS control policy of the APP.

This embodiment of the present disclosure is a QoS control solution in a semi-hosting scenario. The correspondence between a subscriber category of the APP and a QoS control policy of the APP may be hosted on the API management device.

Optionally, based on the foregoing fourth optional embodiment corresponding to FIG. 5, in a fifth optional embodiment of the method for controlling QoS provided in this embodiment of the present disclosure, acquiring, according to the identifier of the APP and the user identifier of the APP, a subscriber category that is of the APP and corresponding to the user identifier of the APP may include acquiring, from the cache data, the subscriber category that is of the APP and corresponding to the user identifier of the APP if cache data of the correspondence between a user identifier of the APP and a subscriber category of the APP exists in a cache area of the API management device, or sending a search request to the APP server according to the first search indication identifier if cache data of the correspondence between a user identifier of the APP and a subscriber category of the APP does not exist in a cache area of the API management device, where the search request carries the user identifier of the APP, and the user identifier of the APP is used by the APP server to search for the subscriber category that is of the APP and corresponding to the user identifier of the APP, and receiving a search response message sent by the APP server, where the search response message carries the subscriber category of the APP, and correspondingly, acquiring, according to the subscriber category of the APP, the QoS control policy that is of the APP and corresponding to the subscriber category of the APP may include acquiring, from the cache area, the QoS control policy that is of the APP and corresponding to the subscriber category of the APP when the subscriber category of the APP is acquired from the cache area, or acquiring, from the non-cache area, the QoS control policy that is of the APP and corresponding to the subscriber category of the APP when the subscriber category of the APP is acquired from the APP server.

In addition, after acquiring, from the non-cache area, the QoS control policy that is of the APP and corresponding to the subscriber category of the APP, the method further includes storing, in the cache area of the API management device, the correspondence between a user identifier of the APP and a subscriber category of the APP and the correspondence between a subscriber category of the APP and a QoS control policy of the APP.

That is, after being acquired from the non-cache area, the correspondence between a user identifier of the APP and a subscriber category of the APP and the correspondence between a subscriber category of the APP and a QoS control policy of the APP are stored in the cache area such that the correspondences can be quickly acquired when the same APP is being used next time.

Optionally, based on the foregoing first optional embodiment corresponding to FIG. 5, in a sixth optional embodiment of the method for controlling QoS provided in this embodiment of the present disclosure, before receiving an API call request that a user terminal is triggered, when the APP is being used, to send, the method further includes receiving a registration request of the APP, and receiving a second search indication identifier and a correspondence between a user identifier of the APP and a subscriber category of the APP, where the second search indication identifier is used to indicate a necessity of searching an APP server for a correspondence between a subscriber category of the APP and a QoS control policy of the APP, and registering the APP according to the registration request, and storing, in the API management device, the second search indication identifier and the correspondence between a user identifier of the APP and a subscriber category of the APP.

This embodiment of the present disclosure is a QoS control solution in a semi-hosting scenario. The correspondence between a user identifier of the APP and a subscriber category of the APP may be hosted on the API management device.

Optionally, based on the foregoing sixth optional embodiment corresponding to FIG. 5, in a seventh optional embodiment of the method for controlling QoS provided in this embodiment of the present disclosure, acquiring, according to the identifier of the APP and the user identifier of the APP, a subscriber category that is of the APP and corresponding to the user identifier of the APP may include acquiring, from the cache data, the subscriber category that is of the APP and corresponding to the user identifier of the APP if cache data of the correspondence between a user identifier of the APP and a subscriber category of the APP exists in a cache area of the API management device, or acquiring, from the correspondence that is between a user identifier of the APP and a subscriber category of the APP and already stored in the non-cache area, the subscriber category that is of the APP and corresponding to the user identifier of the APP if cache data of the correspondence between a user identifier of the APP and a subscriber category of the APP does not exist in a cache area of the API management device, and correspondingly, acquiring, according to the subscriber category of the APP, the QoS control policy that is of the APP and corresponding to the subscriber category of the APP may include acquiring, from the cache area, the QoS control policy that is of the APP and corresponding to the subscriber category of the APP when the subscriber category of the APP is acquired from the cache area, or sending a search request to the APP server according to the second search indication identifier when the subscriber category of the APP is acquired from the non-cache area, where the search request carries the subscriber category of the APP, and the subscriber category of the APP is used by the APP server to search for the QoS control policy that is of the APP and corresponding to the subscriber category of the APP, and receiving a search response message sent by the APP server, where the search response message carries the QoS control policy of the APP.

In addition, after receiving a search response message sent by the APP server, where the search response message carries the QoS control policy of the APP, the method further includes storing, in the cache area of the API management device, the correspondence between a user identifier of the APP and a subscriber category of the APP and the correspondence between a subscriber category of the APP and a QoS control policy of the APP.

That is, after being acquired from the non-cache area, the correspondence between a user identifier of the APP and a subscriber category of the APP and the correspondence between a subscriber category of the APP and a QoS control policy of the APP are stored in the cache area such that the correspondences can be quickly acquired when the same APP is being used next time.

Optionally, based on the foregoing first optional embodiment corresponding to FIG. 5, in an eighth optional embodiment of the method for controlling QoS provided in this embodiment of the present disclosure, before receiving an API call request that a user terminal is triggered, when the APP is being used, to send, the method may further include receiving a registration request of the APP, and receiving a third search indication identifier, where the third search indication identifier is used to instruct to search an APP server for a correspondence between a user identifier of the APP and a subscriber category of the APP and a correspondence between a subscriber category of the APP and a QoS control policy of the APP, and registering the APP according to the registration request, and storing, in the API management device, the third search indication identifier.

Optionally, based on the foregoing eighth optional embodiment corresponding to FIG. 5, in a ninth optional embodiment of the method for controlling QoS provided in this embodiment of the present disclosure, acquiring, according to the user identifier of the APP, a subscriber category that is of the APP and corresponding to the user identifier of the APP and acquiring, according to the subscriber category of the APP, the QoS control policy that is of the APP and corresponding to the subscriber category of the APP may include acquiring, from the cache data, the subscriber category that is of the APP and corresponding to the user identifier of the APP, and acquiring, from the cache area, the QoS control policy that is of the APP and corresponding to the subscriber category of the APP if cache data of the correspondence between a user identifier of the APP and a subscriber category of the APP exists in a cache area of the API management device, or sending a search request to the APP server according to the third search indication identifier if cache data of the correspondence between a user identifier of the APP and a subscriber category of the APP does not exist in a cache area of the API management device, where the search request carries the user identifier of the APP, and the user identifier of the APP is used by the APP server to search for the subscriber category that is of the APP and corresponding to the user identifier of the APP and the QoS control policy that is of the APP and corresponding to the subscriber category of the APP, and receiving a search response message sent by the APP server, where the search response message carries the QoS control policy of the APP.

In addition, after receiving a search response message sent by the APP server, where the search response message carries the QoS control policy of the APP, the method further includes storing, in the cache area of the API management device, the correspondence between a user identifier of the APP and a subscriber category of the APP and the correspondence between a subscriber category of the APP and a QoS control policy of the APP.

That is, after being acquired from a non-cache area, the correspondence between a user identifier of the APP and a subscriber category of the APP and the correspondence between a subscriber category of the APP and a QoS control policy of the APP are stored in the cache area such that the correspondences can be quickly acquired when the same APP is being used next time.

This embodiment of the present disclosure is a solution in a weak hosting scenario in the foregoing embodiment.

Optionally, based on the foregoing third, fifth, seventh, or ninth optional embodiment corresponding to FIG. 5, in a tenth optional embodiment of the method for controlling QoS provided in this embodiment of the present disclosure, when the QoS control policy of the APP is not acquired from the cache area, the method may further include storing, in the cache area of the API management device, the correspondence between a user identifier of the APP and a subscriber category of the APP and the correspondence between a subscriber category of the APP and a QoS control policy of the APP.

Optionally, based on the foregoing embodiment and any one of the foregoing first to tenth optional embodiments corresponding to FIG. 5, in an eleventh optional embodiment of the method for controlling QoS provided in this embodiment of the present disclosure, before acquiring, according to the user identifier, a subscriber category corresponding to the user identifier, the method may further include confirming whether authentication is performed on the APP, and acquiring a user name of the APP and using the user name as the user identifier when authentication is performed, or acquiring the user identifier from an agreement field agreed on between the API and the user terminal in advance when authentication is not performed.

In this embodiment of the present disclosure, the user identifier may be acquired according to an authentication status of the APP.

Optionally, based on the foregoing embodiment and any one of the foregoing first to eleventh optional embodiments corresponding to FIG. 5, in a twelfth optional embodiment of the method for controlling QoS provided in this embodiment of the present disclosure, the method may further include receiving an offline request that is of the APP and sent by the user terminal, and clearing data corresponding to the user identifier from the cache area of the API management device.

In this embodiment of the present disclosure, after a user who uses an APP gets offline, related data of the user in a cache area may be cleared in time in order to relieve pressure on the cache area and improve a running speed.

Optionally, based on the foregoing embodiment and any one of the foregoing first to eleventh optional embodiments corresponding to FIG. 5, in a thirteenth optional embodiment of the method for controlling QoS provided in this embodiment of the present disclosure, the method may further include adding, to the cache area of the API management device, data that is corresponding to the user identifier and generated when the APP runs, and setting a time tag for the data, and clearing expired data from the cache area of the API management device according to the time tag after a preset time is reached.

In this embodiment of the present disclosure, in a running process of an APP of a user, data of the user that is generated when the APP runs may be added to a cache area, a time tag may be set for the data of the user, aging may be periodically performed on cache data, an aging period may be configured for data in the cache area, aging determining may be performed by comparing recorded timestamps, and an aged cache area record may be cleared.

For the embodiment or the optional embodiments corresponding to FIG. 5, reference may be made to descriptions in FIG. 1 to FIG. 4, and details are not described herein again.

Figure 6:
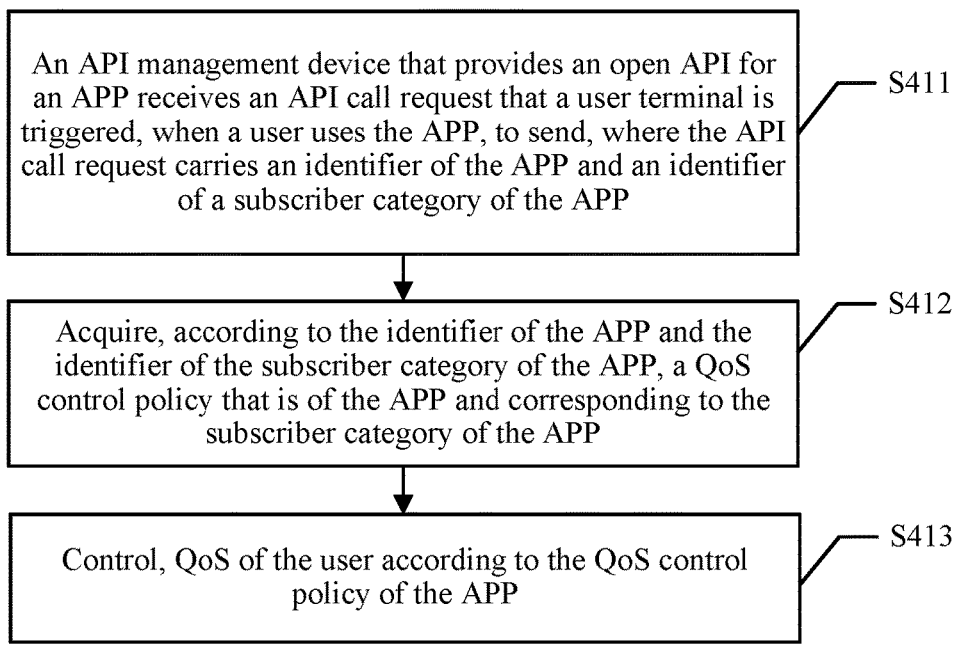
FIG. 6 is a schematic diagram of another embodiment of a method for controlling QoS in an embodiment of the present disclosure.

Referring to FIG. 6, another embodiment of a method for controlling QoS provided in an embodiment of the present disclosure includes the following steps.

Step S411: An API management device that provides an open API for an APP receives an API call request that a user terminal is triggered, when a user uses the APP, to send, where the API call request carries an identifier of the APP and an identifier of a subscriber category of the APP.

Step S412: Acquire, according to the identifier of the APP and the identifier of the subscriber category of the APP, a QoS control policy that is of the APP and corresponding to the subscriber category of the APP.

Step S413: Control, QoS of the user according to the QoS control policy of the APP.

In this embodiment of the present disclosure, an API management device that provides an open API for an APP receives an API call request that a user terminal is triggered, to send when a user uses the APP, where the API call request carries an identifier of the APP and an identifier of a subscriber category of the APP, acquires, according to the identifier of the APP and the identifier of the subscriber category of the APP, a QoS control policy that is of the APP and corresponding to the subscriber category of the APP, and controls, QoS of the user according to the QoS control policy of the APP. In other approaches, an APP developer needs to develop a set of SLAs and QoS management functions for a user. By comparison, according to the method for controlling QoS provided in this embodiment of the present disclosure, QoS control can be provided for an APP that registers with an API management device, which improves the APP development efficiency. In addition, an APP developer needs to perform simple configuration only when an API is registered. Therefore, requirements on experience and skills of the APP developer are further reduced, which lowers a threshold for the APP developer, and an APP development and test period is shortened such that an APP is put into market more quickly and gets a head start in a market.

Optionally, based on the foregoing embodiment corresponding to FIG. 6, in a first optional embodiment of the method for controlling QoS provided in this embodiment of the present disclosure, acquiring, according to the identifier of the APP and the identifier of the subscriber category of the APP, a QoS control policy that is of the APP and corresponding to the subscriber category of the APP includes acquiring, from the cache data, the QoS control policy that is of the APP and corresponding to the subscriber category of the APP if cache data of a correspondence between a subscriber category of the APP and a QoS control policy of the APP exists in a cache area of the API management device, or acquiring, from the correspondence that is between a subscriber category of the APP and a QoS control policy of the APP and already stored in a non-cache area, the QoS control policy that is of the APP and corresponding to the subscriber category of the APP if cache data of a correspondence between a subscriber category of the APP and a QoS control policy of the APP does not exist in a cache area of the API management device.

This embodiment of the present disclosure is a QoS control solution in a full-hosting scenario. The correspondence between a subscriber category and a QoS control policy may be all hosted on the API management device, which can improve the API call efficiency.

Optionally, based on the foregoing embodiment corresponding to FIG. 6, in a second optional embodiment of the method for controlling QoS provided in this embodiment of the present disclosure, acquiring, according to the identifier of the APP and the identifier of the subscriber category of the APP, a QoS control policy that is of the APP and corresponding to the subscriber category of the APP may include acquiring, from the cache data, the QoS control policy that is of the APP and corresponding to the subscriber category of the APP if cache data of a correspondence between a subscriber category of the APP and a QoS control policy of the APP exists in a cache area of the API management device, or sending a search request to an APP server if cache data of a correspondence between a subscriber category of the APP and a QoS control policy of the APP does not exist in a cache area of the API management device, where the search request carries the identifier of the subscriber category of the APP, and the identifier of the subscriber category of the APP is used by the APP server to search for the QoS control policy that is of the APP and corresponding to the subscriber category of the APP, and receiving a search response message sent by the APP server, where the search response message carries the QoS control policy that is of the APP and corresponding to the subscriber category of the APP.

This embodiment of the present disclosure is a QoS control solution in a weak hosting scenario. The QoS control policy corresponding to the subscriber category may be stored in the App server.

Actually, not all QoS control solutions provided in this embodiment of the present disclosure are listed. The QoS control solutions provided in this embodiment of the present disclosure may also include any optional solution such as a buffering solution or a periodic clearing solution in the embodiments corresponding to FIG. 5. For these optional solutions, reference may be made to related descriptions in FIG. 1 to FIG. 4 for understanding, and details are not described herein again.

A solution of determining a QoS control policy using an identifier of a subscriber category according to this embodiment of the present disclosure may be used in a local area network or a securely isolated DMZ in a network environment. The identifier of the subscriber category is directly carried in a request in a plaintext form, and there may be or may not be a user identifier. Alternatively, during network transmission, the identifier of the subscriber category may be directly carried in a request in a ciphertext form, and there may be or may not be a user identifier. The identifier of the subscriber category is directly carried in a request in a plaintext or ciphertext form, and there may be or may not be a user identifier.

Figure 7:
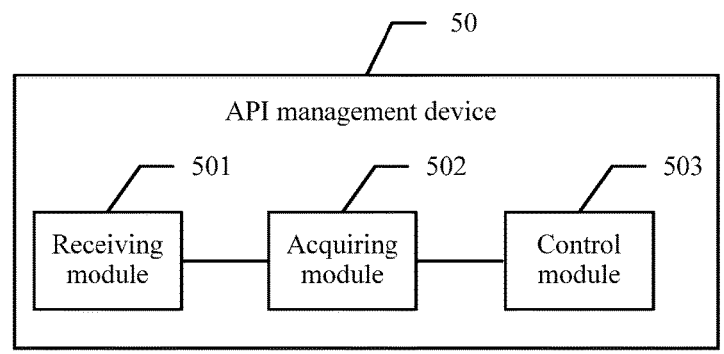
FIG. 7 is a schematic diagram of an embodiment of an API management device in an embodiment of the present disclosure.

FIG. 7 is a schematic diagram of an embodiment of an API management device 50 according to an embodiment of the present disclosure. As shown in FIG. 7, an embodiment of the API management device 50 includes a receiving module 501 configured to receive an API call request that a user terminal is triggered, to send when an APP is being used, where the API call request carries a user identifier of the APP and an identifier of the APP, an acquiring module 502 configured to acquire a QoS control policy of the APP according to the identifier of the APP and the user identifier of the APP that are received by the receiving module 501, and a control module 503 configured to control, according to the QoS control policy that is of the APP and acquired by the acquiring module 502, QoS of a user indicated by the user identifier.

The API management device 50 provided in this embodiment of the present disclosure includes a receiving module 501 configured to receive an API call request that a user terminal is triggered, to send when an APP is being used, where the API call request carries a user identifier of the APP and an identifier of the APP, an acquiring module 502 configured to acquire a QoS control policy of the APP according to the identifier of the APP and the user identifier of the APP that are received by the receiving module 501, and a control module 503 configured to control, according to the QoS control policy that is of the APP and acquired by the acquiring module 502, QoS of a user indicated by the user identifier. In other approaches, an APP developer needs to develop a set of QoS management functions for a user. By comparison, the API management device 50 provided in this embodiment of the present disclosure can provide QoS control for an APP that registers with the API management device 50, which improves the APP development efficiency.

Figure 8:
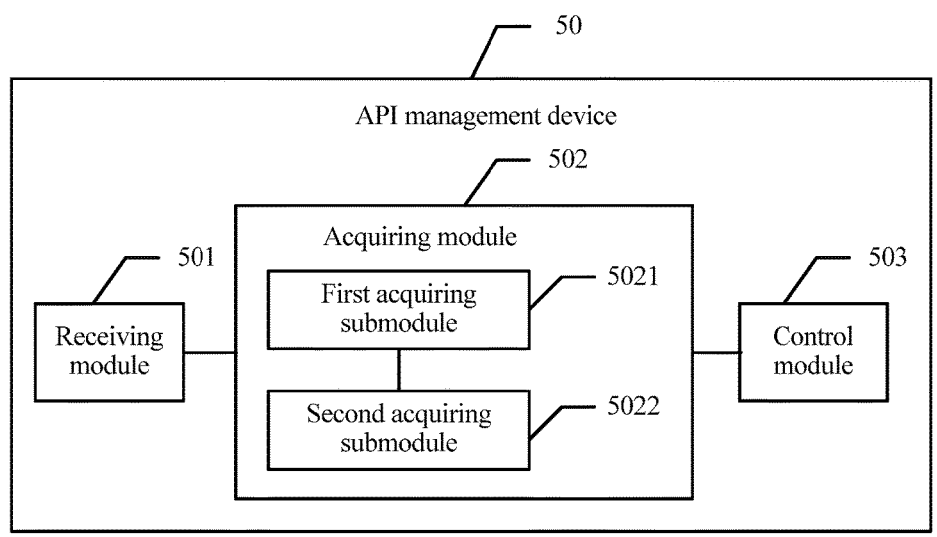
FIG. 8 is a schematic diagram of another embodiment of an API management device in an embodiment of the present disclosure.

Optionally, based on the foregoing embodiment corresponding to FIG. 7, referring to FIG. 8, in a first optional embodiment of the API management device 50 provided in this embodiment of the present disclosure, the acquiring module 502 includes a first acquiring submodule 5021 configured to acquire, according to the identifier of the APP and the user identifier of the APP that are received by the receiving module 501, a subscriber category that is of the APP and corresponding to the user identifier of the APP, and a second acquiring submodule 5022 configured to acquire, according to the subscriber category that is of the APP and acquired by the first acquiring submodule 5021, the QoS control policy that is of the APP and corresponding to the subscriber category of the APP.

Figure 9:
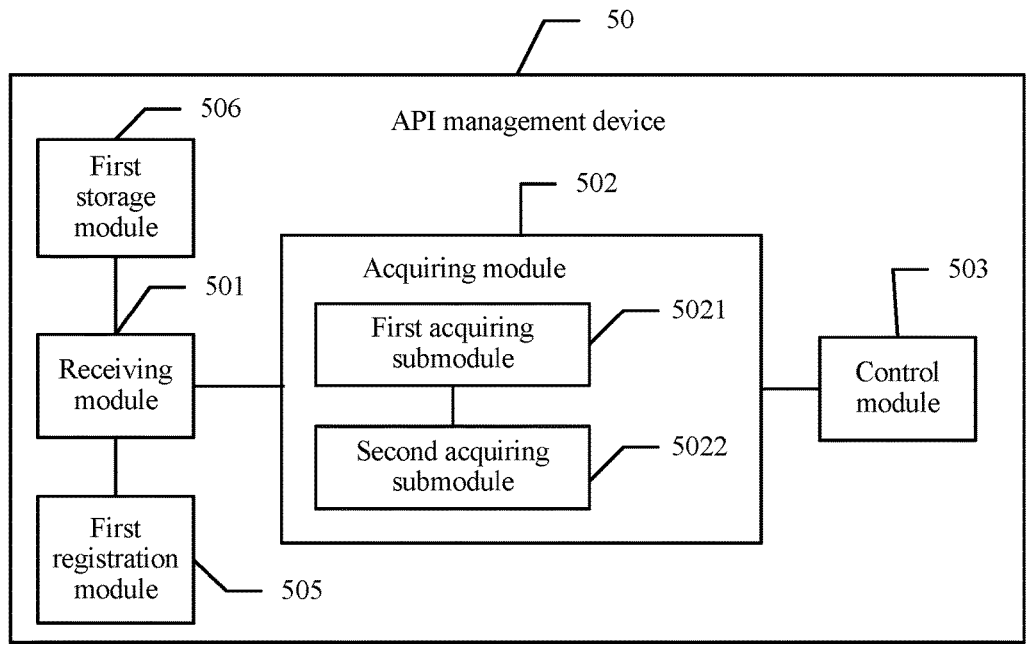
FIG. 9 is a schematic diagram of another embodiment of an API management device in an embodiment of the present disclosure.

Optionally, based on the foregoing embodiment corresponding to FIG. 8, referring to FIG. 9, in a second optional embodiment of the API management device 50 provided in this embodiment of the present disclosure, the API management device 50 further includes a first registration module 505 and a first storage module 506. The receiving module 501 is further configured to receive a registration request of the APP, and receive a correspondence between a user identifier of the APP and a subscriber category of the APP and a correspondence between a subscriber category of the APP and a QoS control policy of the APP. The first registration module 505 is configured to register the APP according to the registration request received by the receiving module 501, and the first storage module 506 is configured to store the correspondence that is between a user identifier of the APP and a subscriber category of the APP and received by the receiving module 501 and the correspondence that is between a subscriber category of the APP and a QoS control policy of the APP and received by the receiving module 501.

Optionally, based on the foregoing embodiment corresponding to FIG. 9, in a third optional embodiment of the API management device 50 provided in this embodiment of the present disclosure, the first acquiring submodule 5021 is further configured to acquire, from the cache data, the subscriber category that is of the APP and corresponding to the user identifier of the APP if cache data of the correspondence between a user identifier of the APP and a subscriber category of the APP exists in a cache area of the API management device, or acquire, from the correspondence that is between a user identifier of the APP and a subscriber category of the APP and already stored in the non-cache area, the subscriber category that is of the APP and corresponding to the user identifier of the APP if cache data of the correspondence between a user identifier of the APP and a subscriber category of the APP does not exist in a cache area of the API management device 50, and the second acquiring submodule 5022 is further configured to acquire, from the cache area, the QoS control policy that is of the APP and corresponding to the subscriber category of the APP when the subscriber category of the APP is acquired from the cache area, or acquire, from the non-cache area, the QoS control policy that is of the APP and corresponding to the subscriber category of the APP when the subscriber category of the APP is acquired from the non-cache area.

Figure 10:
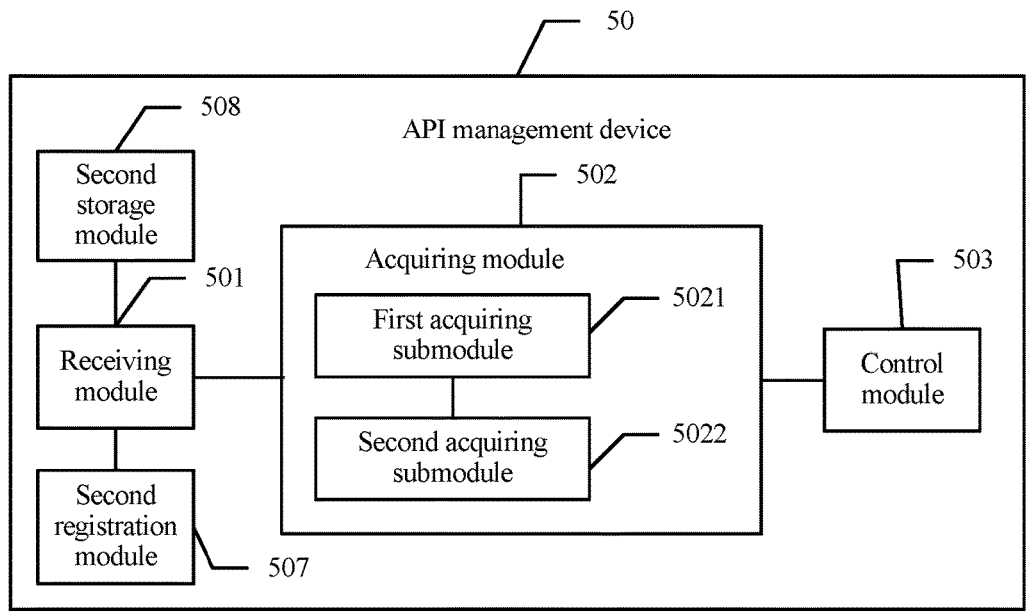
FIG. 10 is a schematic diagram of another embodiment of an API management device in an embodiment of the present disclosure.

Optionally, based on the foregoing embodiment corresponding to FIG. 8, referring to FIG. 10, in a fourth optional embodiment of the API management device 50 provided in this embodiment of the present disclosure, the API management device 50 further includes a second registration module 507 and a second storage module 508, where the receiving module 501 is further configured to receive a registration request of the APP, and receive a first search indication identifier and a correspondence between a subscriber category of the APP and a QoS control policy of the APP, where the first search indication identifier is used to indicate a necessity of searching an APP server for a correspondence between a user identifier of the APP and a subscriber category of the APP. The second registration module 507 is configured to register the APP according to the registration request received by the receiving module 501, and the second storage module 508 is configured to store the first search indication identifier received by the receiving module 501 and the correspondence that is between a subscriber category of the APP and a QoS control policy of the APP and received by the receiving module 501.

Optionally, based on the foregoing embodiment corresponding to FIG. 10, in a fifth optional embodiment of the API management device provided in this embodiment of the present disclosure, the first acquiring submodule 5021 is further configured to acquire, from the cache data, the subscriber category that is of the APP and corresponding to the user identifier of the APP if cache data of the correspondence between a user identifier of the APP and a subscriber category of the APP exists in a cache area of the API management device, or send a search request to the APP server according to the first search indication identifier if cache data of the correspondence between a user identifier of the APP and a subscriber category of the APP does not exist in a cache area of the API management device 50, where the search request carries the user identifier of the APP, and the user identifier of the APP is used by the APP server to search for the subscriber category that is of the APP and corresponding to the user identifier of the APP, and receive a search response message sent by the APP server, where the search response message carries the subscriber category of the APP, and the second acquiring submodule 5022 is further configured to acquire, from the cache area, the QoS control policy that is of the APP and corresponding to the subscriber category of the APP when the subscriber category of the APP is acquired from the cache area, or acquire, from the non-cache area, the QoS control policy that is of the APP and corresponding to the subscriber category of the APP when the subscriber category of the APP is acquired from the APP server.

Figure 11:
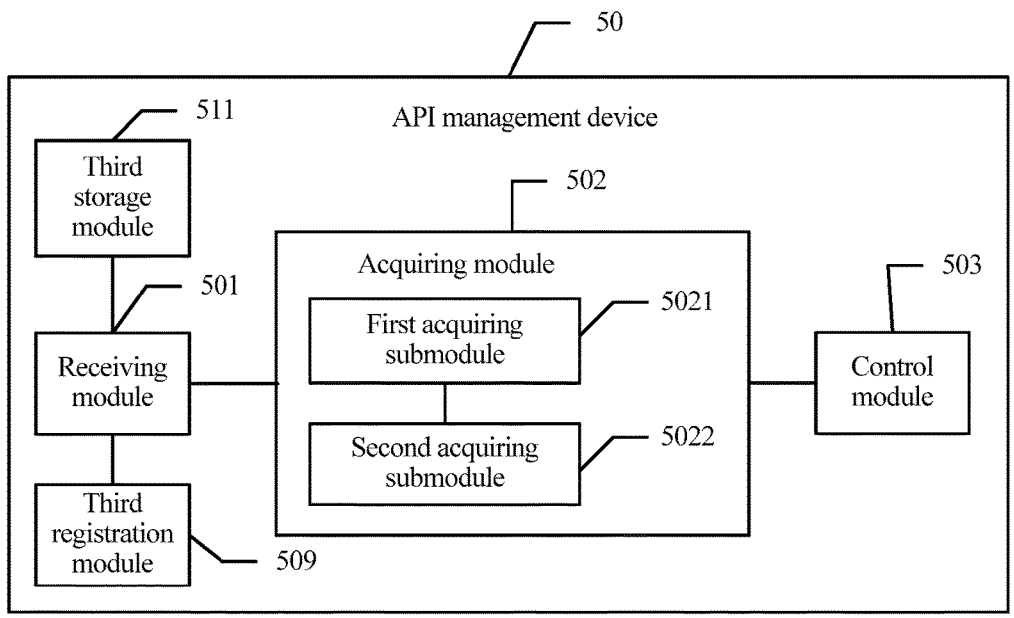
FIG. 11 is a schematic diagram of another embodiment of an API management device in an embodiment of the present disclosure.

Optionally, based on the foregoing embodiment corresponding to FIG. 8, referring to FIG. 11, in a sixth optional embodiment of the API management device 50 provided in this embodiment of the present disclosure, the API management device 50 further includes a third registration module 509 and a third storage module 511, where the receiving module 501 is configured to receive a registration request of the APP, and receive a second search indication identifier and a correspondence between a user identifier of the APP and a subscriber category of the APP, where the second search indication identifier is used to indicate a necessity of searching an APP server for a correspondence between a subscriber category of the APP and a QoS control policy of the APP. The third registration module 509 is configured to register the APP according to the registration request received by the receiving module 501, and the third storage module 511 is configured to store the second search indication identifier received by the receiving module 501 and the correspondence that is between a user identifier of the APP and a subscriber category of the APP and received by the receiving module 501.

Optionally, based on the foregoing embodiment corresponding to FIG. 11, in a seventh optional embodiment of the API management device 50 provided in this embodiment of the present disclosure, the first acquiring submodule 5021 is further configured to acquire, from the cache data, the subscriber category that is of the APP and corresponding to the user identifier of the APP if cache data of the correspondence between a user identifier of the APP and a subscriber category of the APP exists in a cache area of the API management device, or acquire, from the correspondence that is between a user identifier of the APP and a subscriber category of the APP and already stored in the non-cache area, the subscriber category that is of the APP and corresponding to the user identifier of the APP if cache data of the correspondence between a user identifier of the APP and a subscriber category of the APP does not exist in a cache area of the API management device, and the second acquiring submodule 5022 is further configured to acquire, from the cache area, the QoS control policy that is of the APP and corresponding to the subscriber category of the APP when the subscriber category of the APP is acquired from the cache area, or send a search request to the APP server according to the second search indication identifier when the subscriber category of the APP is acquired from the non-cache area, where the search request carries the subscriber category of the APP, and the subscriber category of the APP is used by the APP server to search for the QoS control policy that is of the APP and corresponding to the subscriber category of the APP, and receive a search response message sent by the APP server, where the search response message carries the QoS control policy of the APP.

Figure 12:
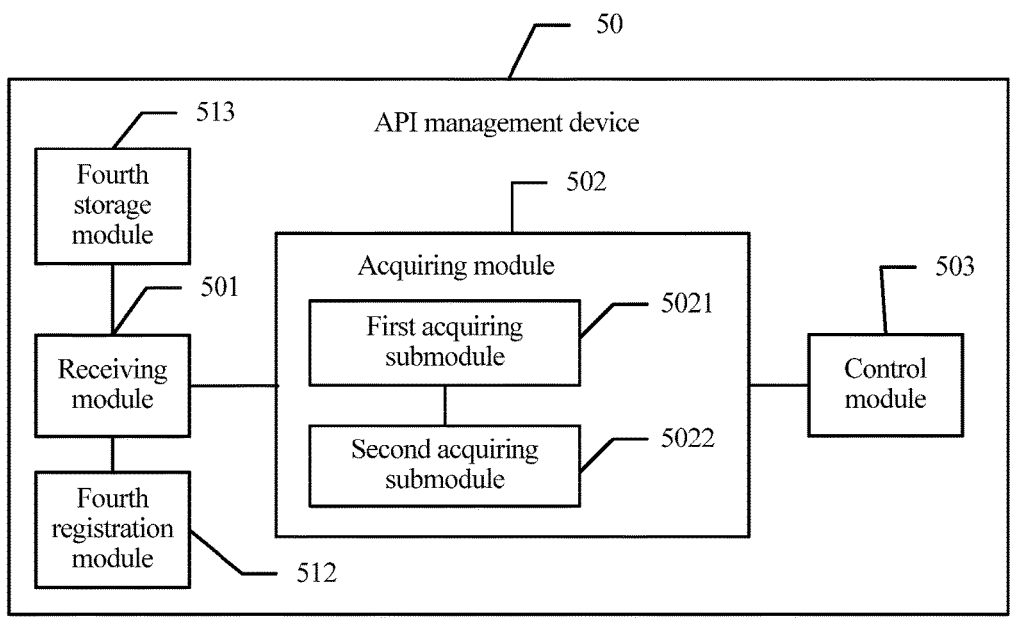
FIG. 12 is a schematic diagram of another embodiment of an API management device in an embodiment of the present disclosure.

Optionally, based on the foregoing embodiment corresponding to FIG. 8, referring to FIG. 12, in an eighth optional embodiment of the API management device 50 provided in this embodiment of the present disclosure, the API management device 50 further includes a fourth registration module 512 and a fourth storage module 513, where the receiving module 501 is further configured to receive a registration request of the APP, and receive a third search indication identifier, where the third search indication identifier is used to instruct to search an APP server for a correspondence between a user identifier of the APP and a subscriber category of the APP and a correspondence between a subscriber category of the APP and a QoS control policy of the APP. The fourth registration module 512 is configured to register the APP according to the registration request received by the receiving module 501, and the fourth storage module 513 is configured to store the third search indication identifier received by the receiving module 501.

Optionally, based on the foregoing embodiment corresponding to FIG. 12, in a ninth optional embodiment of the API management device 50 provided in this embodiment of the present disclosure, the first acquiring submodule 5021 is further configured to acquire, from the cache data, the subscriber category that is of the APP and corresponding to the user identifier of the APP if cache data of the correspondence between a user identifier of the APP and a subscriber category of the APP exists in a cache area of the API management device 50, and the second acquiring submodule 5022 is further configured to acquire, from the cache area, the QoS control policy that is of the APP and corresponding to the subscriber category of the APP when the subscriber category that is of the APP and corresponding to the user identifier of the APP is acquired from the cache data, or send a search request to the APP server according to the third search indication identifier if cache data of the correspondence between a user identifier of the APP and a subscriber category of the APP does not exist in a cache area of the API management device, where the search request carries the user identifier of the APP, and the user identifier of the APP is used by the APP server to search for the subscriber category that is of the APP and corresponding to the user identifier of the APP and the QoS control policy that is of the APP and corresponding to the subscriber category of the APP, and receive a search response message sent by the APP server, where the search response message carries the QoS control policy of the APP.

Optionally, based on the foregoing third, fifth, seventh, and ninth optional embodiments, in a tenth optional embodiment of the API management device 50 provided in this embodiment of the present disclosure, the control module 503 is further configured to store, in the cache area of the API management device 50, the correspondence between a user identifier of the APP and a subscriber category of the APP and the correspondence between a subscriber category of the APP and a QoS control policy of the APP when the QoS control policy of the APP is not acquired from the cache area.

Figure 13:
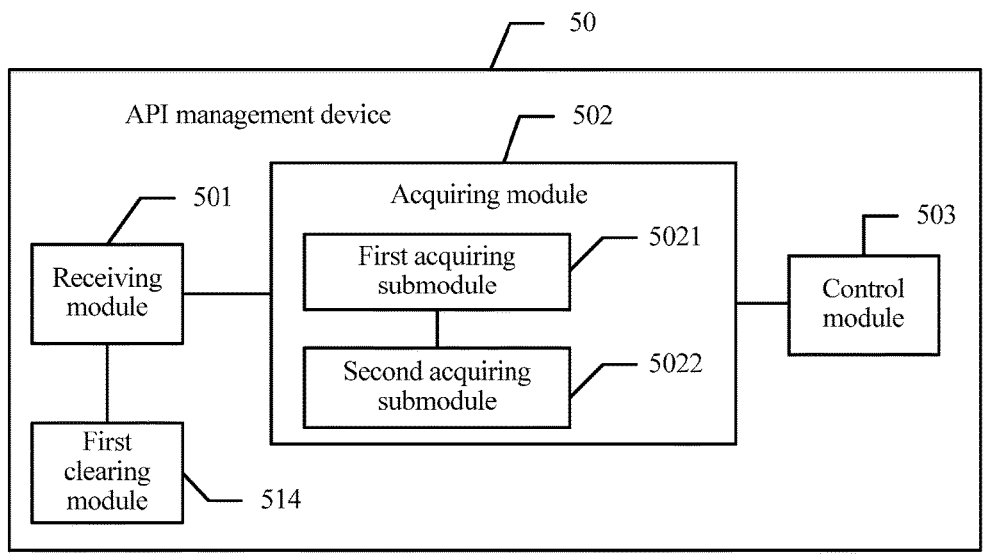
FIG. 13 is a schematic diagram of another embodiment of an API management device in an embodiment of the present disclosure.

Optionally, based on the foregoing embodiment corresponding to FIG. 7 or any optional embodiment, referring to FIG. 13, in an eleventh optional embodiment of the API management device provided in this embodiment of the present disclosure, the API management device further includes a first clearing module 514, where the receiving module 501 is further configured to receive an offline request that is of the APP and sent by the user terminal, and the first clearing module 514 is configured to clear data corresponding to the user identifier from the cache area of the API management device after the receiving module 501 receives the offline request of the APP.

Figure 14:
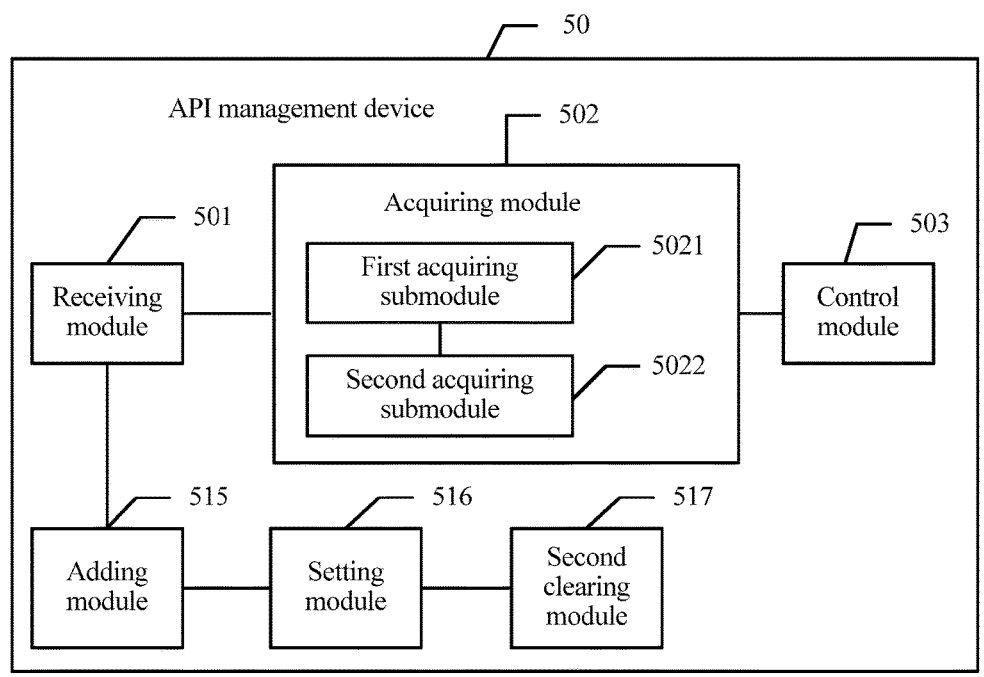
FIG. 14 is a schematic diagram of another embodiment of an API management device in an embodiment of the present disclosure.

Optionally, based on the foregoing embodiment corresponding to FIG. 8 or any optional embodiment, referring to FIG. 14, in a twelfth optional embodiment of the API management device 50 provided in this embodiment of the present disclosure, the API management device 50 further includes an adding module 515, a setting module 516, and a second clearing module 517, where the adding module 515 is configured to add, to the cache area of the API management device, data that is corresponding to the user identifier, generated when the APP runs, and received by the receiving module 501. The setting module 516 is configured to set a time tag for the data added by the adding module 515 to the cache, and the second clearing module 517 is configured to clear expired data from the cache area of the API management device 50 according to the time tag set by the setting module 516 after a preset time is reached.

Figure 15:
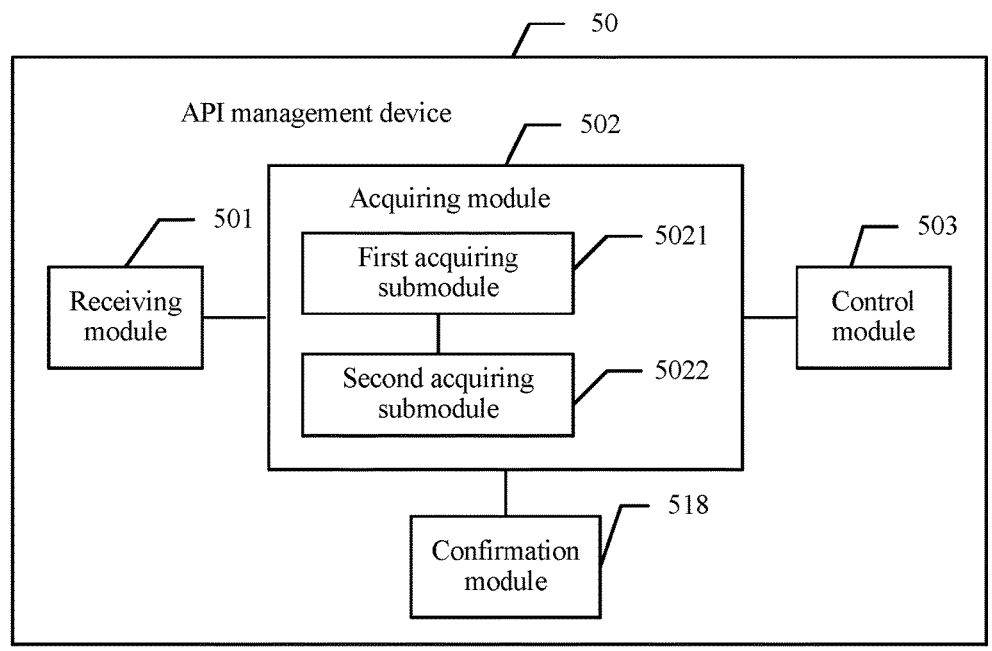
FIG. 15 is a schematic diagram of another embodiment of an API management device in an embodiment of the present disclosure.

Optionally, based on the foregoing embodiment corresponding to FIG. 8 or any optional embodiment, referring to FIG. 15, in a thirteenth optional embodiment of the API management device 50 provided in this embodiment of the present disclosure, the API management device 50 further includes a confirmation module 518, where the confirmation module 518 is configured to confirm whether authentication is performed on the APP, and the first acquiring submodule 5021 is further configured to acquire a user name of the APP and use the user name as the user identifier when the confirmation module 518 confirms that authentication is performed, or acquire the user identifier from an agreement field agreed on between an API and the user terminal in advance when authentication is not performed.

For the API management device described in FIG. 7 to FIG. 15, reference may be made to descriptions in FIG. 1 to FIG. 5 for understanding, and details are not described herein again.

Figure 16:
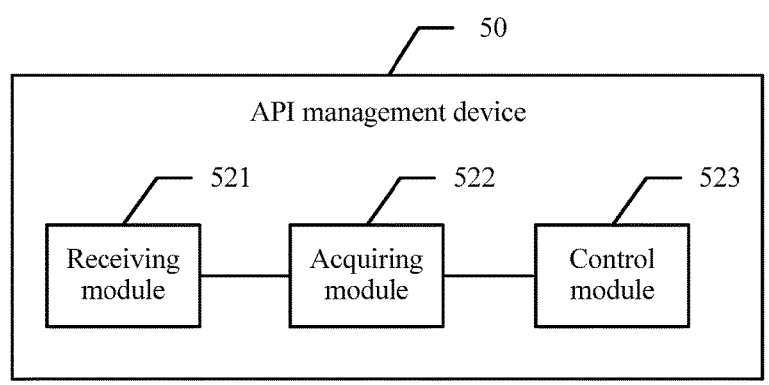
FIG. 16 is a schematic diagram of another embodiment of an API management device in an embodiment of the present disclosure.

Referring to FIG. 16, another embodiment of an API management device 50 provided in an embodiment of the present disclosure includes a receiving module 521 configured to receive an API call request that a user terminal is triggered, to send when a user uses an APP, where the API call request carries an identifier of the APP and an identifier of a subscriber category of the APP, an acquiring module 522 configured to acquire, according to the identifier of the APP and the identifier of the subscriber category of the APP that are received by the receiving module 521, a QoS control policy that is of the APP and corresponding to the subscriber category of the APP, and a control module 523 configured to control, QoS of the user according to the QoS control policy that is of the APP and acquired by the acquiring module 522.

In this embodiment of the present disclosure, a receiving module 521 is configured to receive an API call request that a user terminal is triggered, to send when a user uses an APP, where the API call request carries an identifier of the APP and an identifier of a subscriber category of the APP, an acquiring module 522 is configured to acquire, according to the identifier of the APP and the identifier of the subscriber category of the APP that are received by the receiving module 521, a QoS control policy that is of the APP and corresponding to the subscriber category of the APP, and a control module 523 is configured to control, QoS of the user according to the QoS control policy that is of the APP and acquired by the acquiring module 522. In other approaches, an APP developer needs to develop a set of SLAs and QoS management functions for a user. By comparison, the API management device 50 provided in this embodiment of the present disclosure can provide QoS control for an APP that registers with the API management device, which improves the APP development efficiency. In addition, an APP developer needs to perform simple configuration only when an API is registered. Therefore, requirements on experience and skills of the APP developer are further reduced, which lowers a threshold for the APP developer, and an APP development and test period is shortened such that an APP is put into market more quickly and gets a head start in a market.

Optionally, based on the foregoing embodiment corresponding to FIG. 16, in a first optional embodiment of the API management device 50 provided in this embodiment of the present disclosure, the acquiring module 522 is further configured to acquire, from the cache data, the QoS control policy that is of the APP and corresponding to the subscriber category of the APP if cache data of a correspondence between a subscriber category of the APP and a QoS control policy of the APP exists in a cache area of the API management device, or acquire, from the correspondence that is between a subscriber category of the APP and a QoS control policy of the APP and already stored in a non-cache area, the QoS control policy that is of the APP and corresponding to the subscriber category of the APP if cache data of a correspondence between a subscriber category of the APP and a QoS control policy of the APP does not exist in a cache area of the API management device.

Optionally, based on the foregoing embodiment corresponding to FIG. 16, in a second optional embodiment of the API management device 50 provided in this embodiment of the present disclosure, the acquiring module 522 is further configured to acquire, from the cache data, the QoS control policy that is of the APP and corresponding to the subscriber category of the APP if cache data of a correspondence between a subscriber category of the APP and a QoS control policy of the APP exists in a cache area of the API management device, or send a search request to an APP server if cache data of a correspondence between a subscriber category of the APP and a QoS control policy of the APP does not exist in a cache area of the API management device, where the search request carries the identifier of the subscriber category of the APP, and the identifier of the subscriber category of the APP is used by the APP server to search for the QoS control policy that is of the APP and corresponding to the subscriber category of the APP, and receive a search response message sent by the APP server, where the search response message carries the QoS control policy that is of the APP and corresponding to the subscriber category of the APP.

In the foregoing multiple embodiments of the API management device, it should be understood that, in an implementation manner, receiving and sending functions of a receiving module, a first acquiring submodule, and a second acquiring submodule may be implemented by an input/output (I/O) device (such as a network adapter), a registration module, an adding module, a setting module, a first clearing module, and a second clearing module may be implemented by a processor by executing a program or an instruction in a storage (that is, implemented by means of mutual coordination between the processor and a special instruction in the storage coupled to the processor). In another implementation manner, receiving and sending functions of a receiving module, a first acquiring submodule, and a second acquiring submodule may be implemented by an I/O device (such as a network adapter), a registration module, an adding module, a setting module, a first clearing module, and a second clearing module may be separately implemented using a dedicated circuit, where for a specific implementation manner, refer to the prior art, and details are not described herein again. In still another implementation manner, receiving and sending functions of a receiving module, a first acquiring submodule, and a second acquiring submodule may be implemented by an I/O device (such as a network adapter), a registration module, an adding module, a setting module, a first clearing module, and a second clearing module may be implemented using a field programmable gate array (FPGA), where for a specific implementation manner, refer to other approaches, and details are not described herein again. The present disclosure includes but is not limited to the foregoing implementation manners, and it should be understood that a solution implemented according to an idea of the present disclosure falls within the protection scope of embodiments of the present disclosure.

Figure 17:
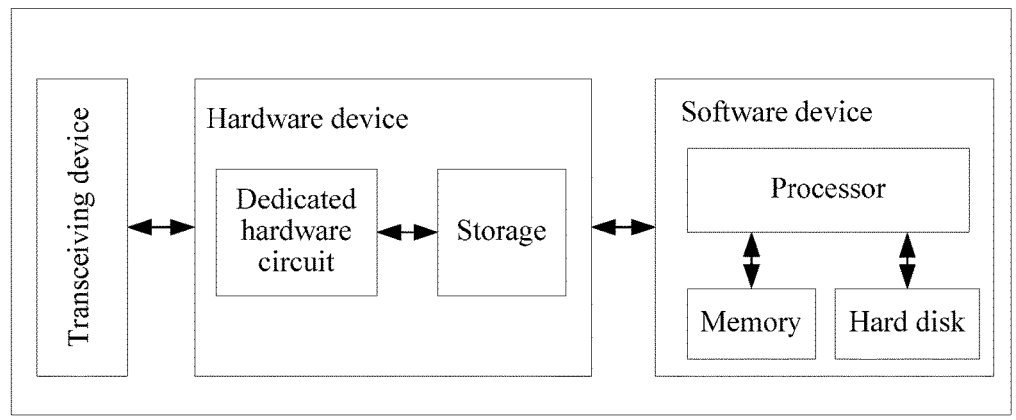
FIG. 17 is a schematic diagram of another embodiment of an API management device in an embodiment of the present disclosure.

This embodiment provides a hardware structure of an API management device. As shown in FIG. 17, the hardware structure of the API management device may include three parts, a transceiving device, a software device, and a hardware device.

The transceiving device is a hardware circuit used to complete packet receiving and sending.

The hardware device may be referred to as a "hardware processing module," or more simply, may be referred to as "hardware" for short. The hardware device mainly includes a hardware circuit that implements some specific functions based on a dedicated hardware circuit such as an FPGA or an application-specific integrated circuit (ASIC) (with another accessory device such as a storage). A processing speed of the hardware device is much higher than that of a general-purpose processor. However, a function of the hardware device is hard to change once being customized. Therefore, the hardware device is not flexible in implementation, and is generally used to process some fixed functions. It should be noted that in an actual application, the hardware device may also include a processor such as a microcontroller unit (MCU) (or a microprocessor such as a single-chip microcomputer) or a central processing unit (CPU). However, these processors are not mainly processing big data but are mainly used to perform some control. In this application scenario, a system that works with these devices is a hardware device.

The software device (or simply referred to as "software") mainly includes a general-purpose processor (such as a CPU) and some accessory devices (such as a storage device such as a memory or a hard disk), and may enable, by means of programming, a processor to have a corresponding processing function. When being implemented using software, the software device may be flexibly configured according to a service requirement. However, a speed is usually lower than that of the hardware device. After processing using the software, the hardware device may send, using the transceiving device, data obtained after processing, or data obtained after processing may be sent to the transceiving device using an interface connected to the transceiving device.

In this embodiment, the transceiving device is configured to send a search request and receive information in the foregoing embodiments, and the software device or the hardware device is configured for APP registration, QoS control, and the like.

Other functions of the hardware device and the software device are already described in detail in the foregoing embodiments, and details are not described herein again.

With reference to accompanying drawings, the following describes in detail a technical solution in which the receiving and sending functions of the receiving module, the first acquiring submodule, and the second acquiring submodule may be implemented by the I/O device (such as a network adapter), and the registration module, the adding module, the setting module, the first clearing module, and the second clearing module may be implemented by the processor by executing the program or the instruction in the storage.

Figure 18:
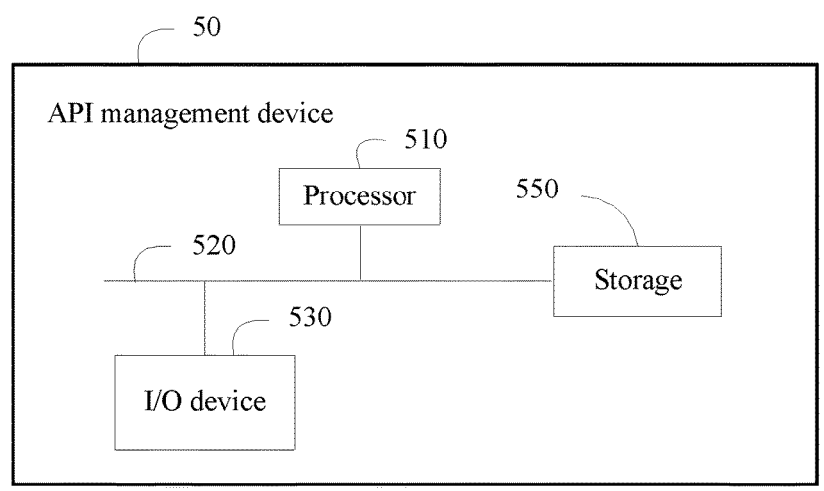
FIG. 18 is a schematic diagram of another embodiment of an API management device in an embodiment of the present disclosure.

FIG. 18 is a schematic structural diagram of an API management device 50 according to an embodiment of the present disclosure. The API management device 50 includes a processor 510, a storage 550, and an I/O device 530, and the storage 550 may include a read-only memory (ROM) and a random access memory (RAM), and provide an operation instruction and data for the processor 510. A part of the storage 550 may further include a non-volatile random access memory (NVRAM).

In some implementation manners, the storage 550 stores an executable module or a data structure, or a subset thereof, or an extended set thereof.

In this embodiment of the present disclosure, by invoking an operation instruction (the operation instruction may be stored in an operating system) stored in the storage 550, the processor 510 is configured to receive, using the I/O device 530, an API call request that a user terminal is triggered to send when an APP is being used, where the API call request carries a user identifier of the APP and an identifier of the APP, acquire a QoS control policy of the APP according to the identifier of the APP and the user identifier of the APP, and control, according to the QoS control policy of the APP, QoS of a user indicated by the user identifier.

It may be learned that in other approaches, an APP developer needs to develop a set of QoS management functions for a user, by comparison, according to the method for controlling QoS provided in this embodiment of the present disclosure, QoS control can be provided for an APP that registers with an API management device 50, which improves the APP development efficiency. In addition, an APP developer needs to perform simple configuration only when an API is registered. Therefore, requirements on experience and skills of the APP developer are further reduced, which lowers a threshold for the APP developer, and an APP development and test period is shortened such that an APP is put into market more quickly and gets a head start in a market.

The processor 510 controls an operation of the API management device 50, and the processor 510 may be also referred to as a CPU. The storage 550 may include a ROM and a RAM, and provide an instruction and data for the processor 510. A part of the storage 550 may further include an NVRAM. In a specific application, the components of the API management device 50 are coupled together using a bus system 520, where in addition to a data bus, the bus system 520 may include a power bus, a control bus, a status signal bus, and the like. However, for clear description, various types of buses in the figure are marked as the bus system 520.

The methods disclosed in the foregoing embodiments of the present disclosure may be applied to the processor 510, or implemented by the processor 510. The processor 510 may be an integrated circuit chip and has a signal processing capability. In an implementation process, the steps in the foregoing methods may be completed using an integrated logic circuit of hardware in the processor 510 or an instruction in a form of software. The foregoing processor 510 may be a general-purpose processor, a digital signal processor (DSP), an ASIC, a field programmable gate array (FPGA), or another programmable logic device, discrete gate or transistor logic device, or discrete hardware component. The processor 510 may implement or execute methods, steps and logical block diagrams disclosed in the embodiments of the present disclosure. The general-purpose processor may be a microprocessor or the processor may be any conventional processor or the like. Steps in the methods disclosed with reference to the embodiments of the present disclosure may be directly executed and completed by means of a hardware decoding processor, or may be executed and completed using a combination of hardware and software modules in a decoding processor. The software module may be located in a mature storage medium in the field, such as a RAM, a flash memory, a ROM, a programmable ROM, an electrically-erasable programmable memory, or a register. The storage medium is located in the storage 550, and the processor 510 reads information in the storage 550 and completes the steps in the foregoing methods in combination with hardware of the processor 510.

Optionally, the processor 510 is further configured to acquire, according to the identifier of the APP and the user identifier of the APP, a subscriber category that is of the APP and corresponding to the user identifier of the APP, and acquire, according to the subscriber category of the APP, the QoS control policy that is of the APP and corresponding to the subscriber category of the APP.

Optionally, the I/O device 530 is further configured to receive a registration request of the APP, and receive a correspondence between a user identifier of the APP and a subscriber category of the APP and a correspondence between a subscriber category of the APP and a QoS control policy of the APP. The processor 510 is further configured to register the APP according to the registration request, and the storage 550 is further configured to store, in the API management device 50, the correspondence between a user identifier of the APP and a subscriber category of the APP and the correspondence between a subscriber category of the APP and a QoS control policy of the APP.

The processor 510 is further configured to acquire, from the cache data, the subscriber category that is of the APP and corresponding to the user identifier of the APP if cache data of the correspondence between a user identifier of the APP and a subscriber category of the APP exists in a cache area of the API management device, or acquire, from the correspondence that is between a user identifier of the APP and a subscriber category of the APP and already stored in the non-cache area, the subscriber category that is of the APP and corresponding to the user identifier of the APP if cache data of the correspondence between a user identifier of the APP and a subscriber category of the APP does not exist in a cache area of the API management device, and acquire, from the cache area, the QoS control policy that is of the APP and corresponding to the subscriber category of the APP when the subscriber category of the APP is acquired from the cache area, or acquire, from the non-cache area, the QoS control policy that is of the APP and corresponding to the subscriber category of the APP when the subscriber category of the APP is acquired from the non-cache area.

Optionally, the I/O device 530 is further configured to receive a registration request of the APP, and receive a first search indication identifier and a correspondence between a subscriber category of the APP and a QoS control policy of the APP, where the first search indication identifier is used to indicate a necessity of searching an APP server for a correspondence between a user identifier of the APP and a subscriber category of the APP. The processor 510 is further configured to register the APP according to the registration request, and the storage 550 is further configured to store, in the API management device 50, the first search indication identifier and the correspondence between a subscriber category of the APP and a QoS control policy of the APP.

The processor 510 is further configured to acquire, from the cache data, the subscriber category that is of the APP and corresponding to the user identifier of the APP if cache data of the correspondence between a user identifier of the APP and a subscriber category of the APP exists in a cache area of the API management device, or, send a search request to the APP server according to the first search indication identifier using the I/O device 530 if cache data of the correspondence between a user identifier of the APP and a subscriber category of the APP does not exist in a cache area of the API management device, where the search request carries the user identifier of the APP, and the user identifier of the APP is used by the APP server to search for the subscriber category that is of the APP and corresponding to the user identifier of the APP, and receive a search response message sent by the APP server, where the search response message carries the subscriber category of the APP, and acquire, from the cache area, the QoS control policy that is of the APP and corresponding to the subscriber category of the APP when the subscriber category of the APP is acquired from the cache area, or acquire, from the non-cache area, the QoS control policy that is of the APP and corresponding to the subscriber category of the APP when the subscriber category of the APP is acquired from the APP server.

Optionally, the I/O device 530 is further configured to receive a registration request of the APP, and receive a second search indication identifier and a correspondence between a user identifier of the APP and a subscriber category of the APP, where the second search indication identifier is used to indicate a necessity of searching an APP server for a correspondence between a subscriber category of the APP and a QoS control policy of the APP. The processor 510 is further configured to register the APP according to the registration request, and the storage 550 is further configured to store, in the API management device 50, the second search indication identifier and the correspondence between a user identifier of the APP and a subscriber category of the APP.

The processor 510 is further configured to acquire, from the cache data, the subscriber category that is of the APP and corresponding to the user identifier of the APP if cache data of the correspondence between a user identifier of the APP and a subscriber category of the APP exists in a cache area of the API management device, or acquire, from the correspondence that is between a user identifier of the APP and a subscriber category of the APP and already stored in the non-cache area, the subscriber category that is of the APP and corresponding to the user identifier of the APP if cache data of the correspondence between a user identifier of the APP and a subscriber category of the APP does not exist in a cache area of the API management device, and acquire, from the cache area, the QoS control policy that is of the APP and corresponding to the subscriber category of the APP when the subscriber category of the APP is acquired from the cache area, or send a search request to the APP server according to the second search indication identifier using the I/O device 530 when the subscriber category of the APP is acquired from the non-cache area, where the search request carries the subscriber category of the APP, and the subscriber category of the APP is used by the APP server to search for the QoS control policy that is of the APP and corresponding to the subscriber category of the APP, and receive a search response message sent by the APP server, where the search response message carries the QoS control policy of the APP.

Optionally, the I/O device 530 is further configured to receive a registration request of the APP, and receive a third search indication identifier, where the third search indication identifier is used to instruct to search an APP server for a correspondence between a user identifier of the APP and a subscriber category of the APP and a correspondence between a subscriber category of the APP and a QoS control policy of the APP. The processor 510 is further configured to register the APP according to the registration request, and the storage 550 is further configured to store, in the API management device 50, the third search indication identifier.

The processor 510 is further configured to acquire, from the cache data, the subscriber category that is of the APP and corresponding to the user identifier of the APP, and acquire, from the cache area, the QoS control policy that is of the APP and corresponding to the subscriber category of the APP if cache data of the correspondence between a user identifier of the APP and a subscriber category of the APP exists in a cache area of the API management device, or send a search request to the APP server according to the third search indication identifier using the I/O device 530 if cache data of the correspondence between a user identifier of the APP and a subscriber category of the APP does not exist in a cache area of the API management device, where the search request carries the user identifier of the APP, and the user identifier of the APP is used by the APP server to search for the subscriber category that is of the APP and corresponding to the user identifier of the APP and the QoS control policy that is of the APP and corresponding to the subscriber category of the APP, and receive a search response message sent by the APP server, where the search response message carries the QoS control policy of the APP.

Optionally, the processor 510 is further configured to store, in the cache area of the API management device 50, the correspondence between a user identifier of the APP and a subscriber category of the APP and the correspondence between a subscriber category of the APP and a QoS control policy of the APP when the QoS control policy of the APP is not acquired from the cache area.

Optionally, the processor 510 is further configured to confirm whether authentication is performed on the APP, and acquire a user name of the APP and use the user name as the user identifier when authentication is performed, or acquire the user identifier from an agreement field agreed on between an API and the user terminal in advance when authentication is not performed.

Optionally, the I/O device 530 is further configured to receive an offline request that is of the APP and sent by the user terminal, and the processor 510 is further configured to clear data corresponding to the user identifier from the cache area of the API management device 50.

Optionally, the processor 510 is further configured to add, to the cache area of the API management device 50, data that is corresponding to the user identifier and generated when the APP runs, and set a time tag for the data, and clear expired data from the cache area of the API management device 50 according to the time tag when a preset time is reached.

In another aspect, referring to FIG. 18, in this embodiment of the present disclosure, according to the API management device 50 provided in this embodiment of the present disclosure, by invoking an operation instruction (the operation instruction may be stored in an operating system) stored in the storage 550, the processor 510 is configured to receive, using the I/O device 530, an API call request that a user terminal is triggered, to send when a user uses an APP, where the API call request carries an identifier of the APP and an identifier of a subscriber category of the APP, acquire, according to the identifier of the APP and the identifier of the subscriber category of the APP, a QoS control policy that is of the APP and corresponding to the subscriber category of the APP, and control, QoS of the user according to the QoS control policy of the APP.

Optionally, the processor 510 is further configured to acquire, from the cache data, the QoS control policy that is of the APP and corresponding to the subscriber category of the APP if cache data of a correspondence between a subscriber category of the APP and a QoS control policy of the APP exists in a cache area of the API management device, or acquire, from the correspondence that is between a subscriber category of the APP and a QoS control policy of the APP and already stored in a non-cache area, the QoS control policy that is of the APP and corresponding to the subscriber category of the APP if cache data of a correspondence between a subscriber category of the APP and a QoS control policy of the APP does not exist in a cache area of the API management device.

Optionally, the processor 510 is further configured to acquire, from the cache data, the QoS control policy that is of the APP and corresponding to the subscriber category of the APP if cache data of a correspondence between a subscriber category of the APP and a QoS control policy of the APP exists in a cache area of the API management device, or send a search request to an APP server using the I/O device if cache data of a correspondence between a subscriber category of the APP and a QoS control policy of the APP does not exist in a cache area of the API management device, where the search request carries the identifier of the subscriber category of the APP, and the identifier of the subscriber category of the APP is used by the APP server to search for the QoS control policy that is of the APP and corresponding to the subscriber category of the APP, and receive a search response message sent by the APP server, where the search response message carries the QoS control policy that is of the APP and corresponding to the subscriber category of the APP.

For the embodiment corresponding to FIG. 18 and other optional embodiments, reference may be made to descriptions in FIG. 1 to FIG. 15, and details are not described herein again.

Figure 19:
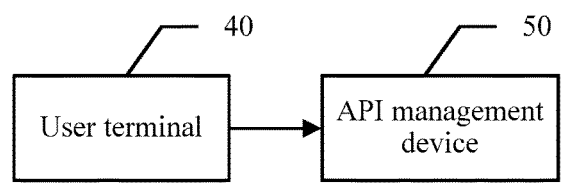
FIG. 19 is a schematic diagram of an embodiment of a system for controlling QoS in an embodiment of the present disclosure.

As shown in FIG. 19, an embodiment of a system for controlling QoS provided in an embodiment of the present disclosure includes a user terminal 40 and an API management device 50.

The API management device 50 is configured to receive an API call request that the user terminal is triggered, to send when an APP is being used, where the API call request carries a user identifier of the APP and an identifier of the APP, acquire, according to the identifier of the APP and the user identifier of the APP, a subscriber category that is of the APP and corresponding to the user identifier of the APP, acquire, according to the subscriber category of the APP, a QoS control policy that is of the APP and corresponding to the subscriber category of the APP, and control, according to the QoS control policy of the APP, QoS of a user indicated by the user identifier.

In another aspect, the API management device 50 is configured to receive an API call request that the user terminal is triggered, to send when a user uses an APP, where the API call request carries an identifier of the APP and an identifier of a subscriber category of the APP, acquire, according to the identifier of the APP and the identifier of the subscriber category of the APP, a QoS control policy that is of the APP and corresponding to the subscriber category of the APP, and control, QoS of the user according to the QoS control policy of the APP.

In other approaches, an APP developer needs to develop a set of QoS management functions for a user. By comparison, the system for controlling QoS provided in this embodiment of the present disclosure can provide QoS control for an APP that registers with an API management device, which improves the APP development efficiency.

For the system embodiment provided in this embodiment of the present disclosure, reference may be further made to descriptions in FIG. 1 to FIG. 18 for understanding, and details are not described herein again.

A person of ordinary skill in the art may understand that all or some of the steps of the methods in the embodiments may be implemented by a program instructing relevant hardware. The program may be stored in a computer-readable storage medium. The storage medium may include a ROM, a RAM, a magnetic disk, or an optical disc.

The foregoing describes in detail the method, the device, and the system for controlling QoS provided in the embodiments of the present disclosure. In this specification, specific examples are used to describe the principle and implementation manners of the present disclosure, and the description of the embodiments is only intended to help understand the method and core idea of the present disclosure. In addition, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. A method for controlling quality of service, wherein the method is applied to an application programming interface (API) management device that provides an open API for an application (APP), and wherein the method comprises:

receiving a registration request of the APP;

receiving a first search indication identifier and a correspondence between a subscriber category of the APP and a quality of service control policy of the APP, wherein the first search indication identifier is used to indicate a necessity of searching an application server for a correspondence between a user identifier of the APP and the subscriber category of the APP;

registering the APP according to the registration request;

storing, in the API management device, the first search indication identifier and the correspondence between the subscriber category of the APP and the quality of service control policy of the APP;

receiving an API call request that a user terminal is triggered to send when the APP is being used, wherein the API call request carries the user identifier of the APP and an identifier of the APP;

acquiring the quality of service control policy of the APP according to the identifier of the APP and the user identifier of the APP by:

acquiring, according to the identifier of the APP and the user identifier of the APP, the subscriber category that is of the APP and corresponding to the user identifier of the APP; and acquiring, according to the subscriber category of the APP, the quality of service control policy that is of the APP and corresponding to the subscriber category of the APP; and controlling, according to the quality of service control policy of the APP, quality of service of a user indicated by the user identifier.

2. The method of claim 1, wherein before receiving the API call request, the method further comprises:

receiving a correspondence between the user identifier of the APP and the subscriber category of the APP and a correspondence between the subscriber category of the APP and the quality of service control policy of the APP; and storing, in the API management device, the correspondence between the user identifier of the APP and the subscriber category of the APP and the correspondence between the subscriber category of the APP and the quality of service control policy of the APP.

3. The method of claim 2, wherein acquiring the subscriber category of the APP comprises:

acquiring, from cache data, the subscriber category that is of the APP and corresponding to the user identifier of the APP when the cache data of the correspondence between the user identifier of the APP and the subscriber category of the APP exists in a cache area of the API management device; and acquiring, from the correspondence that is between the user identifier of the APP and the subscriber category of the APP and already stored in a non-cache area, the subscriber category that is of the APP and corresponding to the user identifier of the APP when the cache data of the correspondence between the user identifier of the APP and the subscriber category of the APP does not exist in the cache area of the API management device, and wherein acquiring the quality of service control policy of the APP comprises:

acquiring, from the cache area, the quality of service control policy that is of the APP and corresponding to the subscriber category of the APP when the subscriber category of the APP is acquired from the cache area; and acquiring, from the non-cache area, the quality of service control policy that is of the APP and corresponding to the subscriber category of the APP when the subscriber category of the APP is acquired from the non-cache area.

4. The method of claim 1, wherein acquiring the subscriber category of the APP comprises:
  acquiring, from cache data, the subscriber category that is of the APP and corresponding to the user identifier of the APP when the cache data of the correspondence between the user identifier of the APP and the subscriber category of the APP exists in a cache area of the API management device;
  sending a search request to the application server according to the first search indication identifier when the cache data of the correspondence between the user identifier of the APP and the subscriber category of the APP does not exist in the cache area of the API management device, wherein the search request carries the user identifier of the APP, and wherein the user identifier of the APP is used by the application server to search for the subscriber category that is of the APP and corresponding to the user identifier of the APP; and
  receiving a search response message sent by the application server, wherein the search response message carries the subscriber category of the APP, and
  wherein acquiring the quality of service control policy of the APP comprises:
    acquiring, from the cache area, the quality of service control policy that is of the APP and corresponding to the subscriber category of the APP when the subscriber category of the APP is acquired from the cache area; and
    acquiring, from a non-cache area, the quality of service control policy that is of the APP and corresponding to the subscriber category of the APP when the subscriber category of the APP is acquired from the application server.

5. The method of claim 1, wherein before receiving the API call request, the method further comprises:
  receiving a second search indication identifier and a correspondence between the user identifier of the APP and the subscriber category of the APP, wherein the second search indication identifier is used to indicate a necessity of searching an application server for a correspondence between the subscriber category of the APP and the quality of service control policy of the APP; and
  storing, in the API management device, the second search indication identifier and the correspondence between the user identifier of the APP and the subscriber category of the APP.

6. The method of claim 5, wherein acquiring the subscriber category of the APP comprises:
  acquiring, from cache data, the subscriber category that is of the APP and corresponding to the user identifier of the APP when the cache data of the correspondence between the user identifier of the APP and the subscriber category of the APP exists in a cache area of the API management device; and
  acquiring, from the correspondence that is between the user identifier of the APP and the subscriber category of the APP and already stored in a non-cache area, the subscriber category that is of the APP and corresponding to the user identifier of the APP when cache data of the correspondence between the user identifier of the APP and the subscriber category of the APP does not exist in the cache area of the API management device,
  and wherein acquiring the quality of service control policy of the APP comprises:
    acquiring, from the cache area, the quality of service control policy that is of the APP and corresponding to the subscriber category of the APP when the subscriber category of the APP is acquired from the cache area;
    sending a search request to the application server according to the second search indication identifier when the subscriber category of the APP is acquired from the non-cache area, wherein the search request carries the subscriber category of the APP, and wherein the subscriber category of the APP is used by the application server to search for the quality of service control policy that is of the APP and corresponding to the subscriber category of the APP; and
    receiving a search response message sent by the application server, wherein the search response message carries the quality of service control policy of the APP.

7. The method of claim 1, wherein before receiving the API call request, the method further comprises:
  receiving a third search indication identifier, wherein the third search indication identifier is used to instruct to search an application server for a correspondence between the user identifier of the APP and the subscriber category of the APP and a correspondence between the subscriber category of the APP and the quality of service control policy of the APP; and
  storing, in the API management device, the third search indication identifier.

8. The method of claim 7, wherein acquiring the subscriber category of the APP and the quality of service control policy of the APP comprises:
  acquiring, from cache data, the subscriber category that is of the APP and corresponding to the user identifier of the APP, and acquiring, from a cache area of the API management device, the quality of service control policy that is of the APP and corresponding to the subscriber category of the APP when the cache data of the correspondence between the user identifier of the APP and the subscriber category of the APP exists in the cache area of the API management device;
  sending a search request to the application server according to the third search indication identifier when the cache data of the correspondence between the user identifier of the APP and the subscriber category of the APP does not exist in the cache area of the API management device, wherein the search request carries the user identifier of the APP, and wherein the user identifier of the APP is used by the application server to search for the subscriber category that is of the APP and corresponding to the user identifier of the APP and the quality of service control policy that is of the APP and corresponding to the subscriber category of the APP; and
  receiving a search response message sent by the application server, wherein the search response message carries the quality of service control policy of the APP.

9. The method of claim 3, wherein when the quality of service control policy of the APP is not acquired from the cache area, the method further comprises storing, in the cache area of the API management device, the correspondence between the user identifier of the APP and the subscriber category of the APP and the correspondence between the subscriber category of the APP and the quality of service control policy of the APP.

10. The method of claim 1, wherein before acquiring, according to the user identifier of the APP, a subscriber category that is of the APP and corresponding to the user identifier of the APP, the method further comprises:
confirming whether authentication is performed on the APP;
acquiring a user name of the APP, and setting the user name as the user identifier when authentication is performed; and
acquiring the user identifier from an agreement field agreed on between the API management device and the user terminal in advance when authentication is not performed.

11. The method of claim 1, further comprising:
receiving an offline request that is of the APP and sent by the user terminal; and
clearing data corresponding to the user identifier from a cache area of the API management device.

12. The method of claim 1, further comprising:
adding, to a cache area of the API management device, data that is corresponding to the user identifier and generated when the APP runs;
setting a time tag for the data; and
clearing expired data from the cache area of the API management device according to the time tag after a preset time is reached.

13. A method for controlling quality of service, wherein the method is applied to an application programming interface (API) management device that provides an open API for an application (APP), and wherein the method comprises:
receiving a registration request of the APP;
receiving a first search indication identifier and a correspondence between a subscriber category of the APP and a quality of service control policy of the APP, wherein the first search indication identifier is used to indicate a necessity of searching an application server for a correspondence between a user identifier of the APP and the subscriber category of the APP;
registering the APP according to the registration request;
storing, in the API management device, the first search indication identifier and the correspondence between the subscriber category of the APP and the quality of service control policy of the APP;
receiving an API call request that a user terminal is triggered to send when a user uses the APP, wherein the API call request carries an identifier of the APP and an identifier of a subscriber category of the APP;
acquiring, according to the identifier of the APP and the identifier of the subscriber category of the APP, the quality of service control policy that is of the APP and corresponding to the subscriber category of the APP by:
acquiring, according to the identifier of the APP and the user identifier of the APP, the subscriber category that is of the APP and corresponding to the user identifier of the APP; and
acquiring, according to the subscriber category of the APP, the quality of service control policy that is of the APP and corresponding to the subscriber category of the APP; and
controlling, quality of service of the user according to the quality of service control policy of the APP.

14. The method of claim 13, wherein acquiring the quality of service control policy of the APP comprises:

acquiring, from cache data, the quality of service control policy that is of the APP and corresponding to the subscriber category of the APP when the cache data of a correspondence between the subscriber category of the APP and the quality of service control policy of the APP exists in a cache area of the API management device; and
acquiring, from the correspondence that is between the subscriber category of the APP and the quality of service control policy of the APP and already stored in a non-cache area, the quality of service control policy that is of the APP and corresponding to the subscriber category of the APP when the cache data of the correspondence between the subscriber category of the APP and the quality of service control policy of the APP does not exist in the cache area of the API management device.

15. The method of claim 13, wherein acquiring the quality of service control policy of the APP comprises:
acquiring, from cache data, the quality of service control policy that is of the APP and corresponding to the subscriber category of the APP when the cache data of a correspondence between the subscriber category of the APP and the quality of service control policy of the APP exists in a cache area of the API management device;
sending a search request to an application server when the cache data of the correspondence between the subscriber category of the APP and the quality of service control policy of the APP does not exist in the cache area of the API management device, wherein the search request carries the identifier of the subscriber category of the APP, and wherein the identifier of the subscriber category of the APP is used by the application server to search for the quality of service control policy that is of the APP and corresponding to the subscriber category of the APP; and
receiving a search response message sent by the application server, wherein the search response message carries the quality of service control policy that is of the APP and corresponding to the subscriber category of the APP.

16. An application programming interface (API) management device, comprising:
a receiver configured to:
receive a registration request of an application (APP);
receive a first search indication identifier and a correspondence between a subscriber category of the APP and a quality of service control policy of the APP, wherein the first search indication identifier is used to indicate a necessity of searching an application server for a correspondence between a user identifier of the APP and the subscriber category of the APP;
receive an API call request that a user terminal is triggered, to send when an application APP is being used, wherein the API call request carries the user identifier of the APP and an identifier of the APP;
a computer processor coupled to the receiver and configured to:
register the APP according to the registration request received by the receiver;
acquire the quality of service control policy of the APP according to the identifier of the APP and the user identifier of the APP that are received by the receiver by:
acquiring, according to the identifier of the APP and the user identifier of the APP that are received by the receiver, a subscriber category that is of the APP and corresponding to the user identifier of the APP; and acquiring, according to the subscriber category that is of the APP, the quality of service control policy that is of the APP and corresponding to the subscriber category of the APP; and control, according to the quality of service control policy that is of the APP, quality of service of a user indicated by the user identifier; and a memory coupled to computer processor and the receiver, wherein the memory is configured to store the first search indication identifier received by the receiver and the correspondence that is between the subscriber category of the APP and the quality of service control policy of the APP and received by the receiver.

17. The API management device of claim 16, wherein the receiver is further configured to receive a correspondence between the user identifier of the APP and the subscriber category of the APP and a correspondence between the subscriber category of the APP and the quality of service control policy of the APP, and wherein the memory is configured to store the correspondence that is between the user identifier of the APP and the subscriber category of the APP and received by the receiver and the correspondence that is between the subscriber category of the APP and the quality of service control policy of the APP and received by the receiver.

18. The API management device of claim 17, wherein the computer processor is further configured to:
   acquire, from cache data, the subscriber category that is of the APP and corresponding to the user identifier of the APP when the cache data of the correspondence between the user identifier of the APP and the subscriber category of the APP exists in a cache area of the API management device;
   acquire, from the correspondence that is between the user identifier of the APP and the subscriber category of the APP and already stored in a non-cache area, the subscriber category that is of the APP and corresponding to the user identifier of the APP when the cache data of the correspondence between the user identifier of the APP and the subscriber category of the APP does not exist in the cache area of the API management device;
   acquire, from the cache area, the quality of service control policy that is of the APP and corresponding to the subscriber category of the APP when the subscriber category of the APP is acquired from the cache area; and
   acquire, from the non-cache area, the quality of service control policy that is of the APP and corresponding to the subscriber category of the APP when the subscriber category of the APP is acquired from the non-cache area.

19. The API management device of claim 16, wherein the computer processor is further configured to:
   acquire, from cache data, the subscriber category that is of the APP and corresponding to the user identifier of the APP when the cache data of the correspondence between the user identifier of the APP and the subscriber category of the APP exists in a cache area of the API management device;
   send a search request to the application server according to the first search indication identifier when the cache data of the correspondence between the user identifier of the APP and the subscriber category of the APP does not exist in the cache area of the API management device, wherein the search request carries the user identifier of the APP, and wherein the user identifier of the APP is used by the application server to search for the subscriber category that is of the APP and corresponding to the user identifier of the APP;
   receive a search response message sent by the application server, wherein the search response message carries the subscriber category of the APP;
   acquire, from the cache area, the quality of service control policy that is of the APP and corresponding to the subscriber category of the APP when the subscriber category of the APP is acquired from the cache area; and
   acquire, from a non-cache area, the quality of service control policy that is of the APP and corresponding to the subscriber category of the APP when the subscriber category of the APP is acquired from the application server.

20. The API management device of claim 16, wherein the receiver is further configured to receive a second search indication identifier and a correspondence between the user identifier of the APP and the subscriber category of the APP, wherein the second search indication identifier is used to indicate a necessity of searching an application server for a correspondence between the subscriber category of the APP and the quality of service control policy of the APP, and wherein the memory is configured to store the second search indication identifier received by the receiver and the correspondence that is between the user identifier of the APP and the subscriber category of the APP and received by the receiver.

21. The API management device of claim 20, wherein the computer processor is further configured to:
   acquire, from cache data, the subscriber category that is of the APP and corresponding to the user identifier of the APP when the cache data of the correspondence between the user identifier of the APP and the subscriber category of the APP exists in a cache area of the API management device;
   acquire, from the correspondence that is between the user identifier of the APP and the subscriber category of the APP and already stored in a non-cache area, the subscriber category that is of the APP and corresponding to the user identifier of the APP when the cache data of the correspondence between the user identifier of the APP and the subscriber category of the APP does not exist in the cache area of the API management device;
   acquire, from the cache area, the quality of service control policy that is of the APP and corresponding to the subscriber category of the APP when the subscriber category of the APP is acquired from the cache area;
   send a search request to the application server according to the second search indication identifier when the subscriber category of the APP is acquired from the non-cache area, wherein the search request carries the subscriber category of the APP, and wherein the subscriber category of the APP is used by the application server to search for the quality of service control policy that is of the APP and corresponding to the subscriber category of the APP; and
   receive a search response message sent by the application server, wherein the search response message carries the quality of service control policy of the APP.

22. The API management device of claim 16, wherein the receiver is further configured to: receive a third search indication identifier, wherein the third search indication identifier is used to instruct to search an application server for a correspondence between the user identifier of the APP and the subscriber category of the APP and a correspondence between the subscriber category of the APP and the quality of service control policy of the APP, and wherein the memory is configured to store the third search indication identifier received by the receiver.

23. The API management device of claim 22, wherein the computer processor is further configured to:
acquire, from cache data, the subscriber category that is of the APP and corresponding to the user identifier of the APP when the cache data of the correspondence between the user identifier of the APP and the subscriber category of the APP exists in a cache area of the API management device;
acquire, from the cache area, the quality of service control policy that is of the APP and corresponding to the subscriber category of the APP when the subscriber category that is of the APP and corresponding to the user identifier of the APP is acquired from the cache data;
send a search request to the application server according to the third search indication identifier when the cache data of the correspondence between the user identifier of the APP and the subscriber category of the APP does not exist in the cache area of the API management device, wherein the search request carries the user identifier of the APP, and wherein the user identifier of the APP is used by the application server to search for the subscriber category that is of the APP and corresponding to the user identifier of the APP and the quality of service control policy that is of the APP and corresponding to the subscriber category of the APP; and
receive a search response message sent by the application server, wherein the search response message carries the quality of service control policy of the APP.

24. The API management device of claim 18, wherein when the quality of service control policy of the APP is not acquired from the cache area, the computer processor is further configured to store, in the cache area of the API management device, the correspondence between the user identifier of the APP and the subscriber category of the APP and the correspondence between the subscriber category of the APP and the quality of service control policy of the APP.

25. The API management device of claim 16, wherein the computer processor is further configured to:
confirm whether authentication is performed on the APP;
acquire a user name of the APP and set the user name as the user identifier when authentication is performed; and
acquire the user identifier from an agreement field agreed on between an API and the user terminal in advance when authentication is not performed.

26. The API management device of claim 16, wherein the receiver is further configured to receive an offline request that is of the APP and sent by the user terminal, and wherein the computer processor is further configured to clear data corresponding to the user identifier from a cache area of the API management device after the receiver receives the offline request of the APP.

27. The API management device of claim 16, wherein the computer processor is further configured to:
add, to a cache area of the API management device, data that is corresponding to the user identifier, generated when the APP runs, and received by the receiver;
set a time tag for the data added to the cache area; and
clear expired data from the cache area of the API management device according to the time tag after a preset time is reached.

28. An application programming interface (API) management device, comprising:
a receiver configured to:
receive a registration request of an application (APP);
receive a first search indication identifier and a correspondence between a subscriber category of the APP and a quality of service control policy of the APP, wherein the first search indication identifier is used to indicate a necessity of searching an application server for a correspondence between a user identifier of the APP and the subscriber category of the APP; and
receive an API call request that a user terminal is triggered to send when a user uses the APP, wherein the API call request carries an identifier of the APP and an identifier of a subscriber category of the APP;
a computer processor coupled to the receiver and configured to:
register the APP according to the registration request received by the receiver;
acquire, according to the identifier of the APP and the identifier of the subscriber category of the APP that are received by the receiver, the quality of service control policy that is of the APP and corresponding to the subscriber category of the APP by:
acquiring, according to the identifier of the APP and the user identifier of the APP that are received by the receiver, a subscriber category that is of the APP and corresponding to the user identifier of the APP; and
acquiring, according to the subscriber category that is of the APP, the quality of service control policy that is of the APP and corresponding to the subscriber category of the APP; and
control, quality of service of the user according to the quality of service control policy that is of the APP; and
a memory coupled to the computer processor and the receiver, wherein the memory is configured to store the first search indication identifier received by the receiver and the correspondence that is between the subscriber category of the APP and the quality of service control policy of the APP and received by the receiver.

29. The API management device of claim 28, wherein the computer processor is further configured to:
acquire, from cache data, the quality of service control policy that is of the APP and corresponding to the subscriber category of the APP when the cache data of a correspondence between the subscriber category of the APP and the quality of service control policy of the APP exists in a cache area of the API management device; and
acquire, from the correspondence that is between the subscriber category of the APP and the quality of service control policy of the APP and already stored in a non-cache area, the quality of service control policy that is of the APP and corresponding to the subscriber category of the APP when the cache data of the correspondence between the subscriber category of the APP and the quality of service control policy of the APP does not exist in the cache area of the API management device.

30. The API management device of claim 28, wherein the computer processor is further configured to:

acquire, from cache data, the quality of service control policy that is of the APP and corresponding to the subscriber category of the APP when the cache data of a correspondence between the subscriber category of the APP and the quality of service control policy of the APP exists in a cache area of the API management device;

send a search request to an application server when the cache data of the correspondence between the subscriber category of the APP and the quality of service control policy of the APP does not exist in the cache area of the API management device, wherein the search request carries the identifier of the subscriber category of the APP, and wherein the identifier of the subscriber category of the APP is used by the application server to search for the quality of service control policy that is of the APP and corresponding to the subscriber category of the APP; and receive a search response message sent by the application server, wherein the search response message carries the quality of service control policy that is of the APP and corresponding to the subscriber category of the APP.

31. An application programming interface (API) management device, comprising:
an input/output device;
a processor; and
a storage,
wherein the input/output device, the processor, and the storage are communicatively connected to each other using a bus,
wherein the input/output device is configured to:
  receive a registration request of an application (APP);
  receive a first search indication identifier and a correspondence between a subscriber category of the APP and a quality of service control policy of the APP, wherein the first search indication identifier is used to indicate a necessity of searching an application server for a correspondence between a user identifier of the APP and the subscriber category of the APP; and
  receive an API call request that a user terminal is triggered to send when the APP is being used, wherein the API call request carries the user identifier of the APP and an identifier of the APP, and
wherein the processor is configured to:
  register the APP according to the registration request received by the input/output device;
  acquire the quality of service control policy of the APP according to the identifier of the APP and the user identifier of the APP by:
    acquiring, according to the identifier of the APP and the user identifier of the APP, the subscriber category that is of the APP and corresponding to the user identifier of the APP; and
    acquiring, according to the subscriber category of the APP, the quality of service control policy that is of the APP and corresponding to the subscriber category of the APP; and
  control, according to the quality of service control policy of the APP, quality of service of a user indicated by the user identifier, and
wherein the storage is configured to store the first search indication identifier and the correspondence between the subscriber category of the APP and the quality of service control policy of the APP.

32. An application programming interface (API) management device, comprising:
an input/output device;
a processor; and
a storage,
wherein the input/output device, the processor, and the storage are communicatively connected to each other using a bus,
wherein the input/output device is configured to:
  receive a registration request of an application (APP);
  receive a first search indication identifier and a correspondence between a subscriber category of the APP and a quality of service control policy of the APP, wherein the first search indication identifier is used to indicate a necessity of searching an application server for a correspondence between a user identifier of the APP and the subscriber category of the APP; and
  receive an API call request that a user terminal is triggered to send when a user uses an application (APP), wherein the API call request carries an identifier of the APP and an identifier of a subscriber category of the APP, and
wherein the processor is configured to:
  register the APP according to the registration request received by the input/output device;
  acquire, according to the identifier of the APP and the identifier of the subscriber category of the APP, the quality of service control policy of the APP and corresponding to the subscriber category of the APP by:
    acquiring, according to the identifier of the APP and the user identifier of the APP, the subscriber category that is of the APP and corresponding to the user identifier of the APP; and
    acquiring, according to the subscriber category of the APP, the quality of service control policy that is of the APP and corresponding to the subscriber category of the APP; and
  control, quality of service of the user according to the quality of service control policy of the APP, and
wherein the storage is configured to store the first search indication identifier and the correspondence between the subscriber category of the APP and the quality of service control policy of the APP.

33. A system for controlling quality of service, comprising:
a user terminal; and
an application programming interface (API) management device,
wherein the API management device is configured to:
  receive a registration request of an application (APP);
  receive a first search indication identifier and a correspondence between a subscriber category of the APP and a quality of service control policy of the APP, wherein the first search indication identifier is used to indicate a necessity of searching an application server for a correspondence between a user identifier of the APP and the subscriber category of the APP;
  register the APP according to the registration request;
  store, in the API management device, the first search indication identifier and the correspondence between the subscriber category of the APP and the quality of service control policy of the APP;
  acquire, according to an identifier of the APP and the user identifier of the APP that are received by a receiver, a subscriber category that is of the APP and corresponding to the user identifier of the APP; and acquire, according to the subscriber category that is of the APP, the quality of service control policy that is of the APP and corresponding to the subscriber category of the APP by:
  acquiring, according to the identifier of the APP and the user identifier of the APP, the subscriber category that is of the APP and corresponding to the user identifier of the APP; and
  acquiring, according to the subscriber category of the APP, the quality of service control policy that is of the APP and corresponding to the subscriber category of the APP.

34. A system for controlling quality of service, comprising;
a user terminal; and
an application programming interface (API) management device,
wherein the API management device comprises:
  a receiver configured to:
    receive a registration request of an application (APP);
    receive a first search indication identifier and a correspondence between a subscriber category of the APP and a quality of service control policy of the APP, wherein the first search indication identifier is used to indicate a necessity of searching an application server for a correspondence between a user identifier of the APP and the subscriber category of the APP;
    receive an API call request that the user terminal is triggered to send when a user uses the APP, wherein the API call request carries an identifier of the APP and an identifier of the subscriber category of the APP; and
  a computer processor coupled to the receiver and configured to:
    register the APP according to the registration request;
    acquire, according to the identifier of the APP and the identifier of the subscriber category of the APP that are received by the receiver, a quality of service control policy that is of the APP and corresponding to the subscriber category of the APP by:
      acquiring, according to the identifier of the APP and the user identifier of the APP, the subscriber category that is of the APP and corresponding to the user identifier of the APP; and
      acquiring, according to the subscriber category of the APP, the quality of service control policy that is of the APP and corresponding to the subscriber category of the APP; and
    control, quality of service of the user according to the quality of service control policy that is of the APP.

* * * * *